United States Patent
Doreau et al.

(10) Patent No.: US 12,131,166 B2
(45) Date of Patent: Oct. 29, 2024

(54) METHODS AND SYSTEMS FOR WORKFLOW AUTOMATION

(71) Applicant: GE Precision Healthcare LLC, Wauwatosa, WI (US)

(72) Inventors: Benoit Doreau, Yvelines (FR); Diana Paiva Moreira Batista, Yvelines (FR); Jerome Knoplioch, Yvelines (FR); Wassila Imambaccus, Yvelines (FR)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 101 days.

(21) Appl. No.: 17/659,782

(22) Filed: Apr. 19, 2022

(65) Prior Publication Data
US 2023/0333860 A1   Oct. 19, 2023

(51) Int. Cl.
G06F 9/44 (2018.01)
G06F 9/30 (2018.01)
G06F 9/445 (2018.01)

(52) U.S. Cl.
CPC ...... *G06F 9/44505* (2013.01); *G06F 9/30036* (2013.01)

(58) Field of Classification Search
CPC .................. G06F 9/32; G06F 1/12; G06F 9/44
See application file for complete search history.

(56) References Cited

U.S. PATENT DOCUMENTS

| | | | |
|---|---|---|---|
| 10,298,995 B1 * | 5/2019 | Stumbo | H04L 65/80 |
| 11,036,523 B2 | 6/2021 | Almecija et al. | |
| 11,093,510 B2 | 8/2021 | Balik et al. | |
| 2007/0061735 A1 * | 3/2007 | Hoffberg | G06V 40/103 |
| | | | 715/744 |
| 2013/0046556 A1 * | 2/2013 | Yeluri | G16H 15/00 |
| | | | 705/3 |
| 2015/0185995 A1 | 7/2015 | Shoemaker et al. | |
| 2020/0380432 A1 | 12/2020 | Wang et al. | |

OTHER PUBLICATIONS

Katakam, N., "How Can We 'Design' An Intelligent Recommendation Engine?," UX Planet Website, Available Online at https://uxplanet.org/how-can-we-design-an-intelligent-recommendation-engine-b9bb1db4d050, Jan. 7, 2019, 25 pages.

Parveez, S. et al., "Recommendation System Tutorial with Python using Collaborative Filtering," Towards AI Website, Available Online at https://pub.towardsai.net/recommendation-system-in-depth-tutorial-with-python-for-netflix-using-collaborative-filtering-533ff8a0e444, Oct. 12, 2020, 26 pages.

* cited by examiner

*Primary Examiner* — Keshab R Pandey
(74) *Attorney, Agent, or Firm* — McCoy Russell LLP

(57) ABSTRACT

Methods and systems are disclosed for providing automated assistance to a user of a software application on a computing device. In one example, a method comprises, during operation of a software application running on a computing device by a user, the user prompted to select an option of a plurality of options of the software application at a step of the operation: predicting, via an automated assistance service running on the computing device, one or more preferred options of a plurality of options of the software application based on administrative guidelines, best practices, and previous selections made by the user, peers of the user, and other local users; displaying the one or more preferred options on a display device of the software application; receiving a selection of a most suitable option of the one or more preferred options from the user; and applying the selected option in the software application.

11 Claims, 9 Drawing Sheets

METHODS AND SYSTEMS FOR WORKFLOW AUTOMATION

TECHNICAL FIELD

Embodiments of the subject matter disclosed herein relate to workflow automation, and more specifically, to providing automated assistance to a user at one or more steps of a workflow.

BACKGROUND

Users of software applications may be confronted with repetitive configuration tasks and decisions, that may distract from work-related tasks. More specifically, using the software applications may involve carrying out various preparation actions for configuring a computing device and/or the software applications for an efficient workflow. The preparation actions may occur at decision points, at which an option may be selected by the user or by the software application. For example, clinicians, such as radiologists, review medical imaging exams generated by medical imaging systems, such as ultrasound or computerized tomography (CT) imaging systems, to determine patient treatment and/or diagnosis. During an exam review workflow, the radiologist may select an imaging series at a first decision point; select one or more applications to launch at a second decision point; select a layout of a user interface (UI) at a third decision point; select an exam to review at a fourth decision point; and so on. Carrying out the preparation actions may involve numerous interactions with the UI (e.g., mouse clicks), which may take time and may increase a level of user frustration.

As relevant technologies evolve, users increasingly request and expect higher levels of automation from applications, where artificial intelligence (AI) approaches are used to automate the preparation steps, thereby freeing the user to focus on the work-related tasks. However, the AI approaches may entail collecting and processing large amounts of data, which may consume resources of the computing device and introduce delays in interactions with the user.

SUMMARY

The current disclosure provides support for a method, comprising, during operation of a software application running on a computing device by a user, the user prompted to select an option of a plurality of options of the software application at a step of the operation: predicting, via an automated assistance service running on the computing device, one or more preferred options of a plurality of options of the software application based on administrative guidelines, best practices, and previous selections made by the user, peers of the user, and other local users; displaying the one or more preferred options on a display device of the software application; receiving a selection of a most suitable option of the one or more preferred options from the user; and applying the selected option in the software application. Additionally, if a predicted probability of one option of the one or more preferred options exceeds a threshold probability, the option may be automatically selected. By automatically selecting a most probable option, or by presenting the user with a shorter list of proposed options rather than a full list of available options, a time spent by the user proceeding through an exam review workflow may be reduced, and a frustration of the user due to navigating a plurality of menus during the workflow may be reduced.

An advantage of the systems and methods provided herein is that by providing automated assistance based on unidimensional context information (e.g., historical and/or statistical data regarding typical local configuration and local use, peer usage, and user preference data, and the like), an assistive artificial intelligence (AI) algorithm may not demand a large quantity of data for training, and as a result, a flexibility of an automated workflow assistance service with respect to modality and possible tuning may be greater than applications that rely on other types of decision models. Further, an amount of memory and processing power consumed by the assistive AI algorithm may be reduced, by iteratively using a plurality of context category/option matrices to successively eliminate options of the plurality of options to generate the one or more preferred options. An additional advantage of the approach proposed herein is that the automated workflow assistance service may be used initially without any usage data, with a high level of explainability and a high ease of use. Further, because assistance is provided at individual decision points rather than over a course of an end-to-end process, it may be applied in a variety of contexts and domains.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which.

DETAILED DESCRIPTION

Figure 1A:
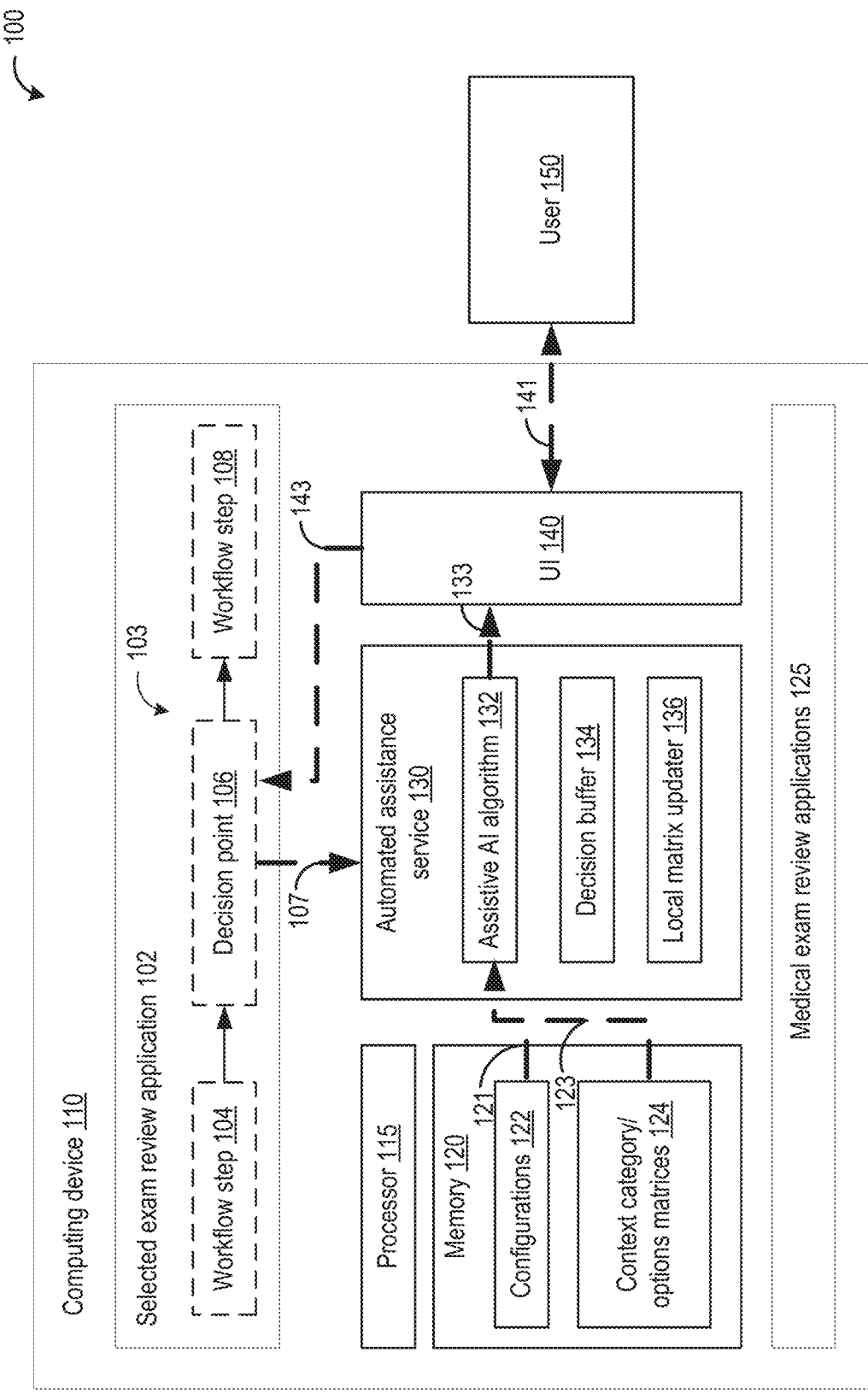
FIG. 1A is a schematic block diagram of an automated workflow assistance system showing a first flow of data, in accordance with one or more embodiments of the present disclosure.

The methods and systems described herein relate to a workflow assistance service that aids a user in using one or more software applications on a computing device, such as a personal computer. For illustrative purposes, the methods and systems are described herein in relation to a workflow of a radiologist when reviewing medical images such as radiology exams on the computing device. However, it should be appreciated that the methods and systems may also be extended to other types of workflows involving different types of software applications without departing from the scope of this disclosure.

To review a medical imaging exam, a user (e.g., a radiologist or imaging specialist) may carry out a plurality of clinical tasks over a course of a workflow for reviewing exams. The workflow for reviewing exams may periodically involve decision points, where each decision point is a point during the workflow at which an option is selected for carrying out a subsequent step of a workflow, from a list of possible options. For example, when a radiologist initiates a review of radiology exam, at a first decision point, the radiologist may select an exam to review from a list of exams; at a second decision point, the radiologist may select a clinical application best suited to review the exam from a list of clinical applications; at a third decision point, the radiologist may select a preferred configuration of the clinical application; at a fourth decision point, the radiologist may select a preferred layout of images within the clinical application; and so on. When the list of options is long and the decisions are frequent, selecting suitable options can be time-consuming, frustrating, cumbersome, and error-prone for the radiologist.

Providing automated assistance in a manner that supports a user's workflow when reviewing medical imaging exams may be difficult. Current approaches to automated assistance may not be simple, easy to use, explainable, or directly configurable by the users. Complexity in automated assistance may lead to longer inference times, which may cause time-lags or delays at the user interface. The time-lags or delays may cause user frustration, as targeted decisions may be frequent and synchronous. Automated assistance routines may not provide sufficient flexibility for different degrees of tuning, to meet a user's expectations with respect to a type of automation (e.g., automation vs. openness). The automated assistance may not have a high level of tolerance to software and/or user error. Additionally, an automation system may not be easily applied to new decision types in a workflow.

To increase an efficiency of a workflow, a proposed automated assistance service may intervene at various steps during the workflow (e.g., decision points) to assist the user. At a decision point, the automated assistance service may use artificial intelligence (AI) to predict a probable option for a next workflow step for the user. If a predicted probability of an option being selected is greater than a threshold probability, the automated assistance service may automatically select the option for the user at the decision point. If no options are predicted with a probability greater than the threshold probability, the automated assistance service may propose one or more options from which the user may select a suitable option.

For example, the automated assistance service may display a short list of preferred options (e.g., of a larger list of available options) to the user, which may be ordered based on a predicted suitability. Options that are unsuitable or not supported may be removed from the list. The user may select a preferred option from the list more rapidly than selecting an option from an unordered, exhaustive list of a plurality of available options. In this way, an amount of time taken to negotiate the decision points may be reduced, leading to a faster, easier, and more efficient review of the exam and a more desirable user experience.

One potential issue with generating the short list of preferred options is that when the plurality of available options is large, a large amount of memory and a large amount of processing power may be used by the computing device to determine the short list of preferred options. To address this issue, as described herein, the short list of preferred options and/or a most probable option may be generated by an assistive AI algorithm of the automated assistance service that consults information about available options stored in one or more matrices showing interactions between various options and various context categories. For example, an exam type/application matrix may indicate a suitability of each application of a list of applications for reviewing each exam type of a list of exam types. In various embodiments, the one or more matrices may be consulted sequentially to iteratively refine a list of candidate options for the user in an efficient manner. In other words, by eliminating unsuitable and/or improbable options during a sequential and iterative refinement of the list of candidate options based on the matrices, an amount of memory used and an amount of processing performed by the computing device may be reduced, increasing a speed of the computing device and the automated assistance service, and thereby enabling the user to move more rapidly through the workflow.

In other embodiments, the one or more matrices may be consulted in a non-sequential manner to generate the list of candidate options.

Additional benefits of the automated assistance service include that it may be used for product management, to understand usage patterns and user needs for further development efforts; to increase a quality of service, by promoting training and best practices to users; and/or for sales and/or marketing, by providing a greater understanding of options that users may benefit from.

Figure 1B:
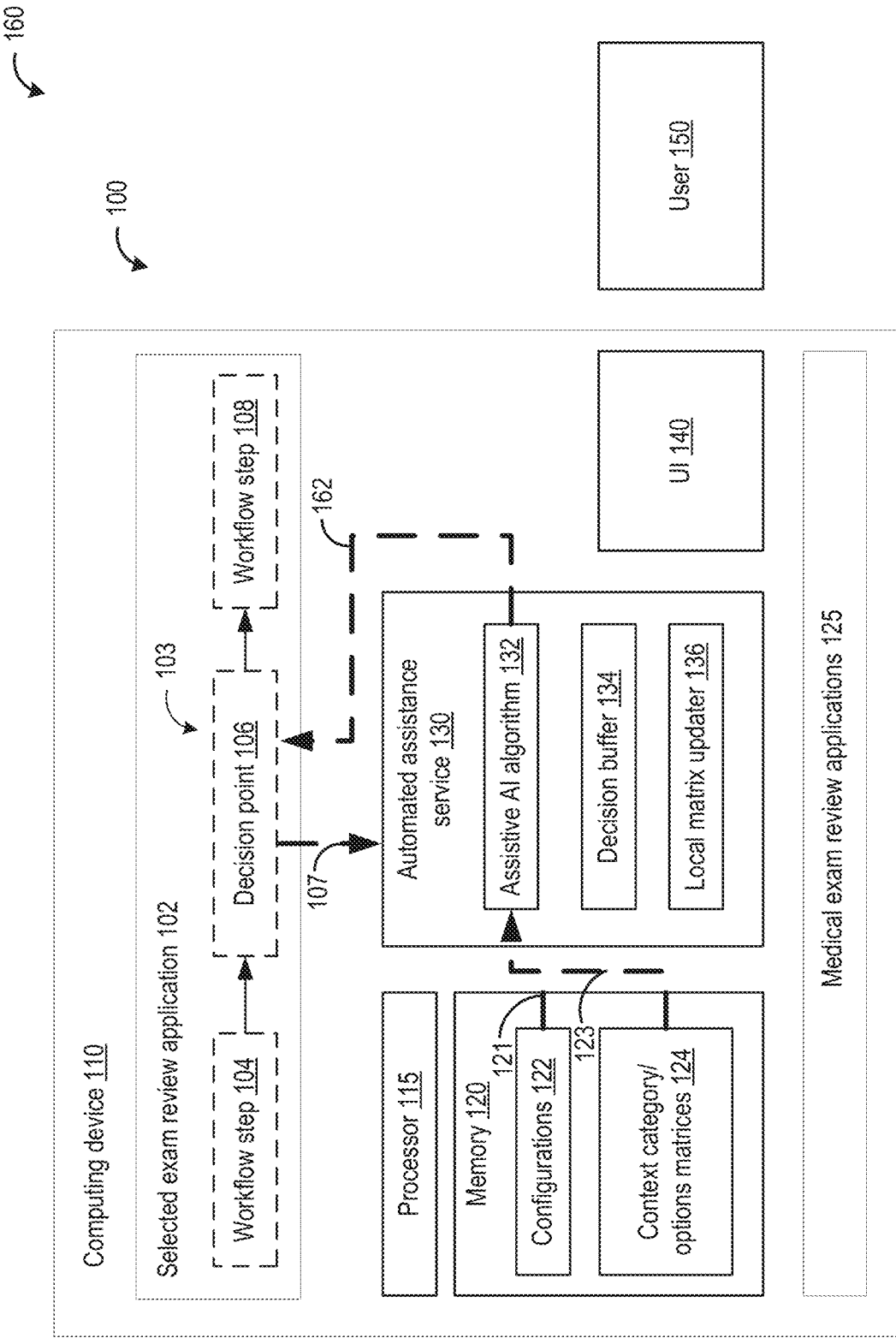
FIG. 1B is a schematic block diagram of an automated workflow assistance system showing a second flow of data, in accordance with one or more embodiments of the present disclosure.
Figure 1C:
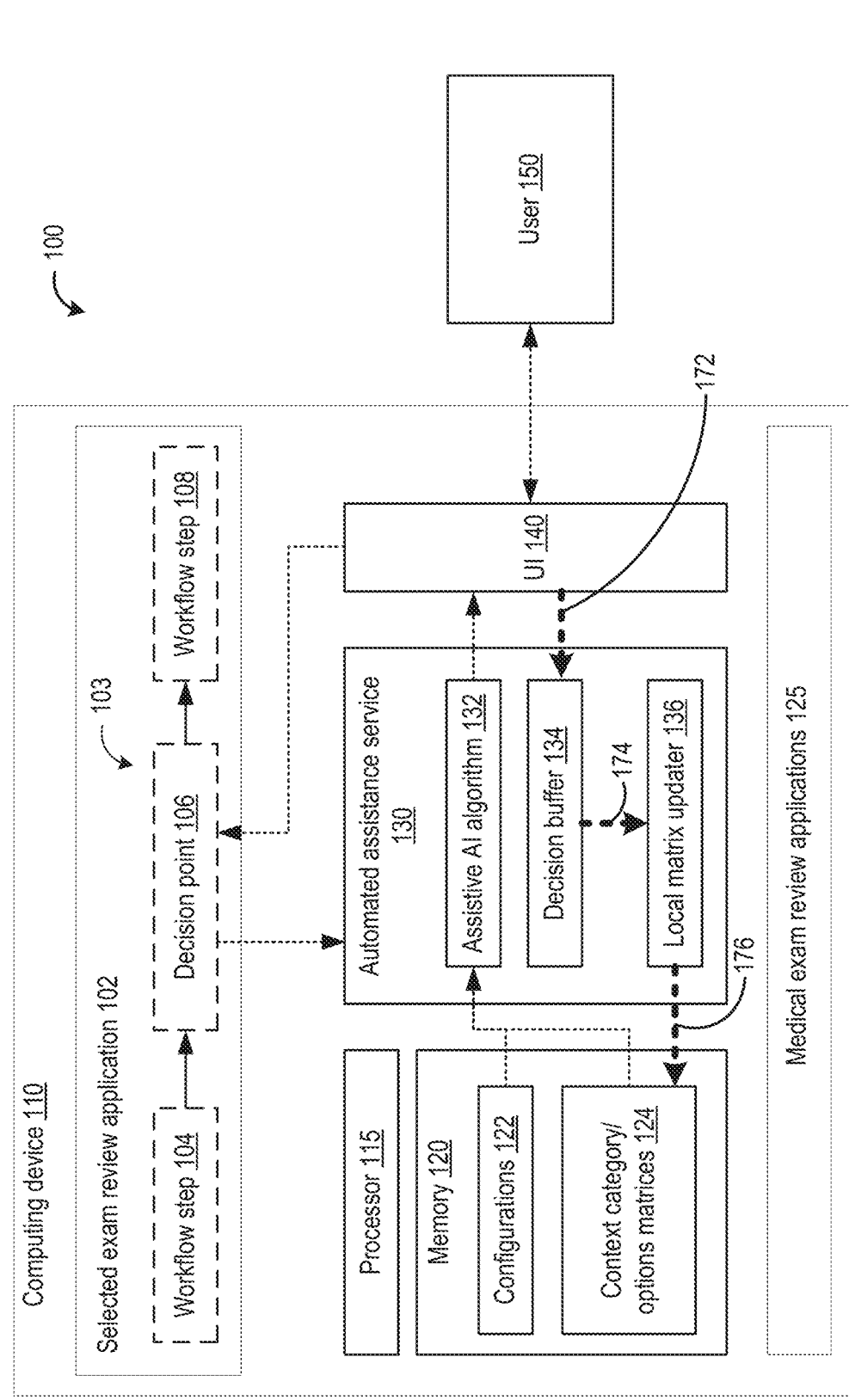
FIG. 1C is a schematic block diagram of an automated workflow assistance system showing a third flow of data, in accordance with one or more embodiments of the present disclosure.
Figure 1D:
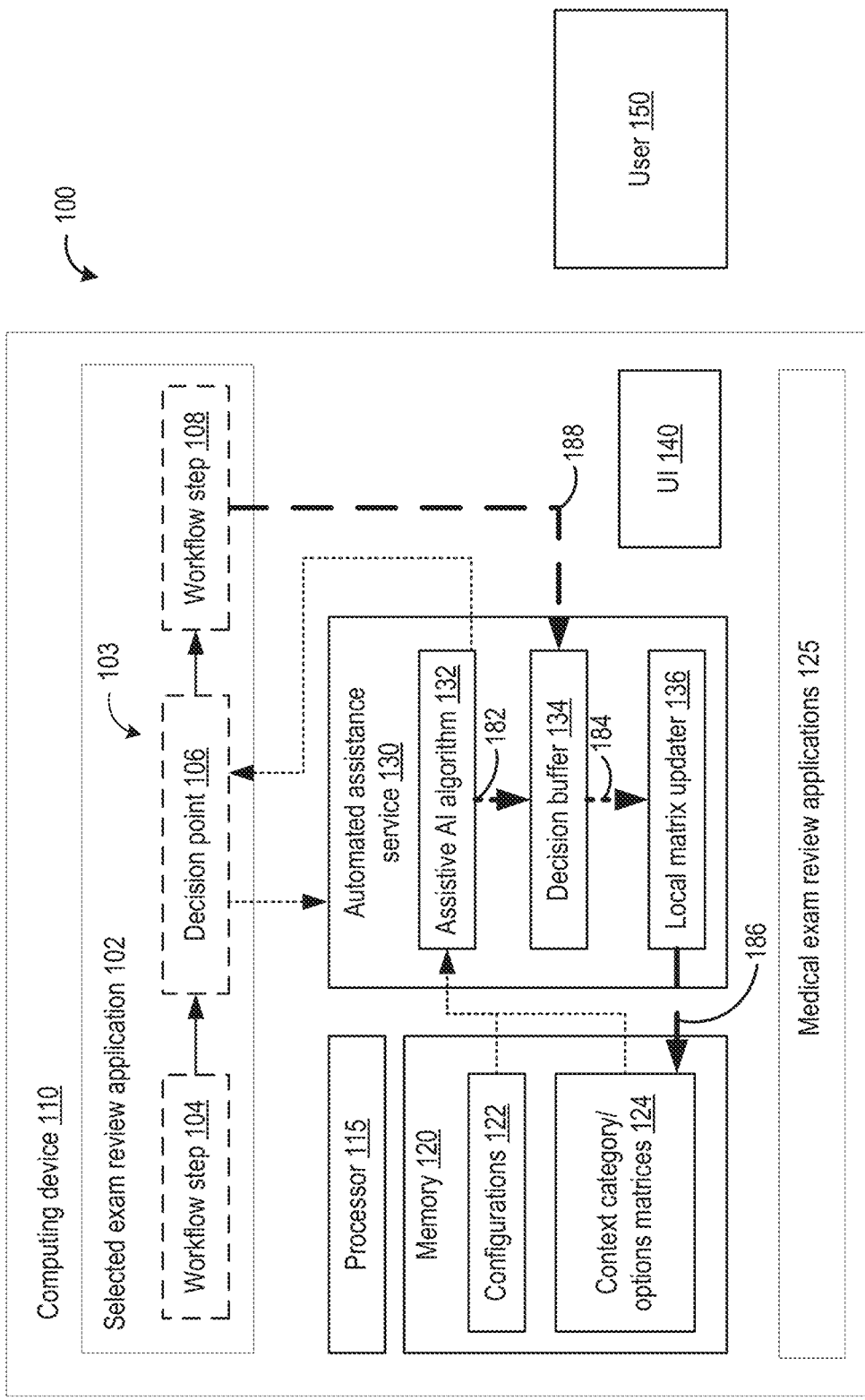
FIG. 1D is a schematic block diagram of an automated workflow assistance system showing a fourth flow of data, in accordance with one or more embodiments of the present disclosure.

FIG. 1A shows an automated workflow assistance system, where a first flow of data through the system is indicated. In the first flow of data, an automated assistance service applies an assistive AI algorithm to a workflow at a decision point of the workflow to predict one or more workflow options, which are presented to a user for selection. The one or more workflow options may be predicted based on a plurality of context category/option matrices, as explained herein. A second flow of data through the automated workflow assistance system is shown in FIG. 1B, where the automated assistance service automatically selects a predicted workflow option with a high probability. A third flow of data through the automated workflow assistance system is shown in FIG. 1C, where a workflow option selected by the user is used to update a local context category/option matrix to increase a future accuracy of predictions of the automated assistance service. A fourth flow of data through the automated workflow assistance system is shown in FIG. 1D, where a workflow option automatically selected by the automated assistance service and corrected by the user is used to update the local context category/option matrix.

Figure 2A:
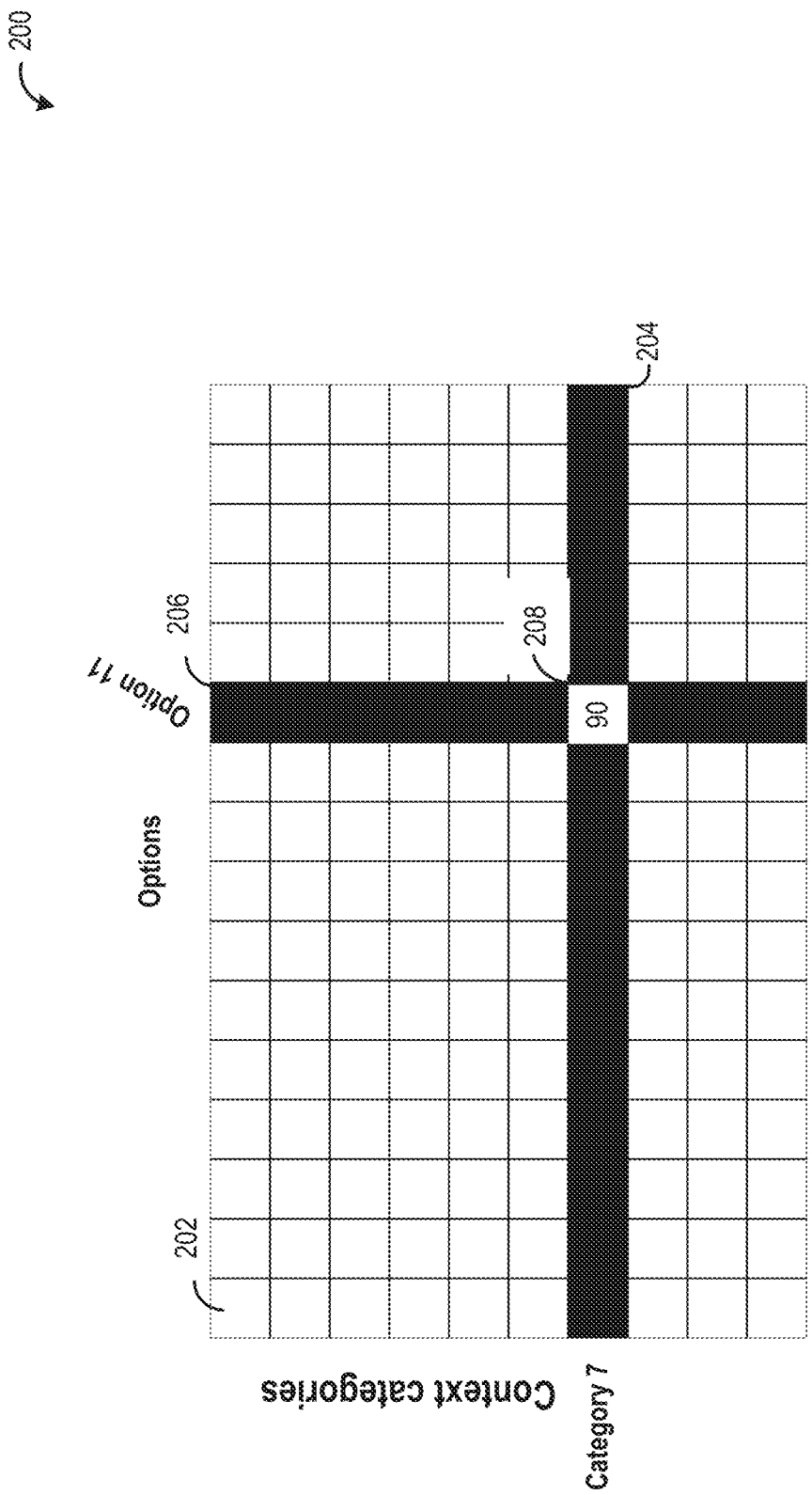
FIG. 2A is a general context category/option matrix used for predicting a workflow option relevant to a given decision type, in accordance with one or more embodiments of the present disclosure.
Figure 2B:
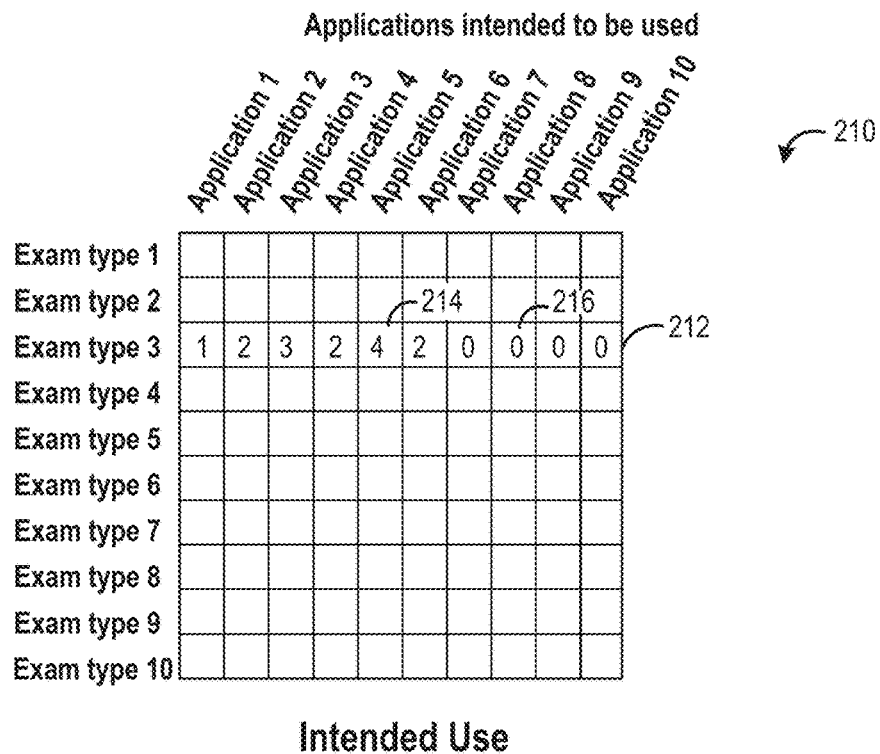
FIG. 2B is a first example exam type/application matrix for predicting a workflow option relevant to a given decision type, in accordance with one or more embodiments of the present disclosure.
Figure 2C:
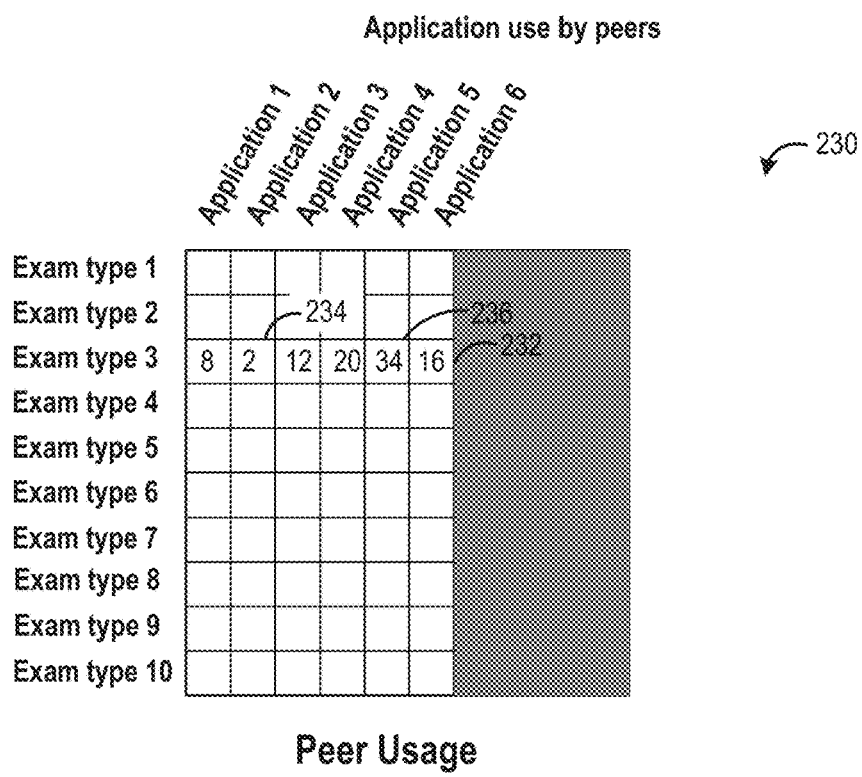
FIG. 2C is a second example exam type/application matrix for predicting a workflow option relevant to a given decision type, in accordance with one or more embodiments of the present disclosure.
Figure 2D:
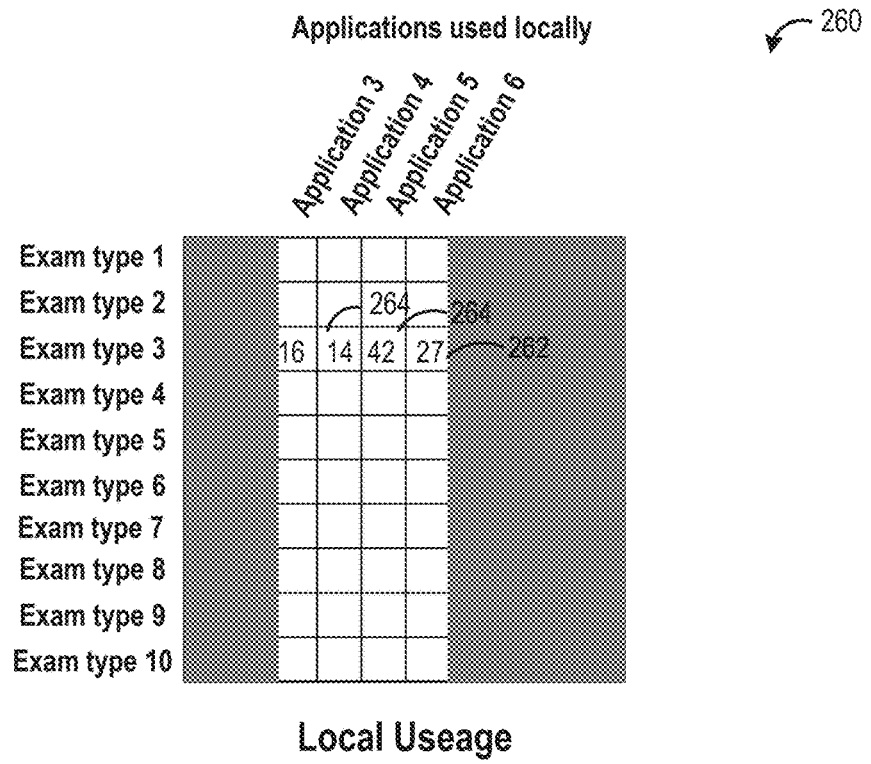
FIG. 2D is a third example exam type/application matrix for predicting a workflow option relevant to a given decision type, in accordance with one or more embodiments of the present disclosure.
Figure 2E:
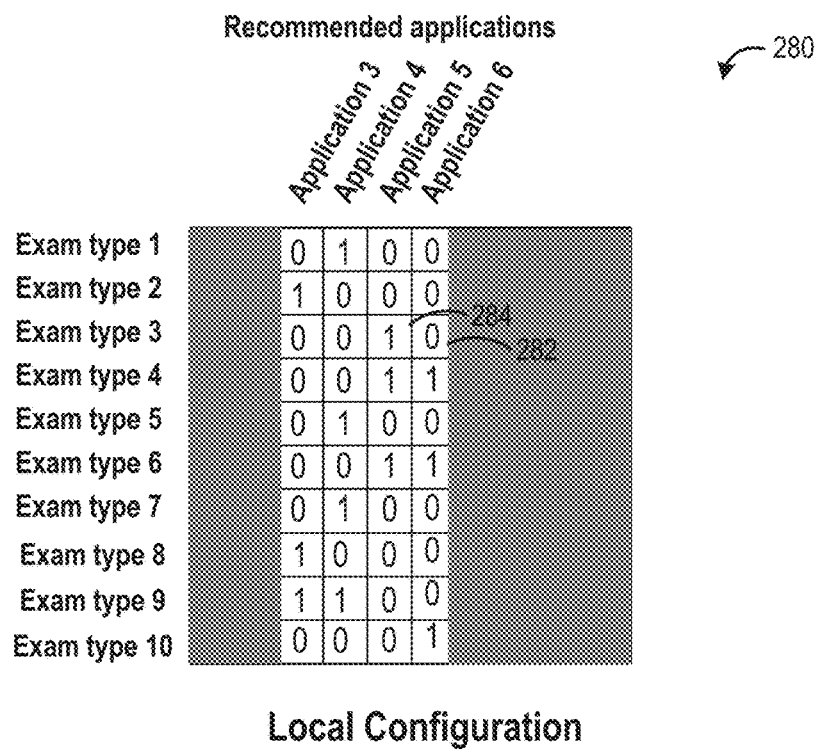
FIG. 2E is a fourth example exam type/application matrix for predicting a workflow option relevant to a given decision type, in accordance with one or more embodiments of the present disclosure.

FIG. 2A shows a generic model of a context category/option matrix for predicting a workflow option, where the context category/option matrix indicates options that are relevant and/or compatible with each context category. FIGS. 2B-2E show a series of example context category/option matrices where the context categories are exam types, and the options are applications that may be used to review exams of each exam type. In FIG. 2B, a first exam type/application matrix shows applications that are intended to be used for a set of exam types. In FIG. 2C, a second exam type/application matrix shows applications selected in the past by peers of the user for a set of exam types. In FIG. 2D, a third exam type/application matrix shows applications selected locally in the past (e.g., options previously selected by an individual user, group of users, or users of a particular system) for a set of exam types. In FIG. 2E, a fourth exam type/application matrix shows applications historically preferred by the user or by a local administrator (e.g., local configuration options) for reviewing one or more exam types. The context category/option matrices shown in FIGS. 2A-2E may be used to predict one or more workflow options, of which one option may be selected either by the user or automatically by the application, by following one or more steps of a method illustrated in FIG. 3. The assistive AI algorithm may be reinforced or tuned by updating one or more context category/option matrices and/or configurations of the automated workflow assistance system based on a selection of an option by the user, by following one or more steps of a method illustrated in FIG. 4.

Referring to FIG. 1A, an automated workflow assistance system 100 is shown comprising a computing device 110 and a user 150. Computing device 110 may be a computing device, such as a desktop computer (e.g., a PC or a workstation), a laptop, a tablet, or different kind of computing device. In some embodiments, computing device 110 may be an image processing device dedicated to reviewing images from medical exams, such as an image review server, an image post-processing system, a PACS system, an acquisition console on an acquisition machine, or a cloud multi-tenant image review service.

Computing device 110 may include a processor 115, a memory 120, and a UI 140. Processor 115 may control an operation of computing device 110 in response to control signals received at UI 140 from user 150. UI 140 may include a display device (e.g., screen or monitor) and/or other subsystems. In some embodiments, UI 140 may be integrated into computing device 110, where a user may interact with, adjust, or select control elements in UI 140 (e.g., buttons, knobs, touchscreen elements, voice command, etc.) to send one or more control signals to the processor 115 from UI 140. In other embodiments, UI 140 is not integrated into the computing device 110, and the user may interact with, adjust, or select control elements in UI 140 via a user input device, such as a mouse, track ball, touchpad, etc., or the operator may interact with UI 140 via a separate touchscreen, where the operator touches a display screen of UI 140 to interact with UI 140, or via another type of input device.

Processor 115 may execute instructions stored on the memory 120 to control computing device 110. As discussed herein, memory 120 may include any non-transitory computer readable medium in which programming instructions are stored. For the purposes of this disclosure, the term "tangible computer readable medium" is expressly defined to include any type of computer readable storage. The example methods and systems may be implemented using coded instruction (e.g., computer readable instructions) stored on a non-transitory computer readable medium such as a flash memory, a read-only memory (ROM), a random-access memory (RAM), a cache, or any other storage media in which information is stored for any duration (e.g. for extended period time periods, permanently, brief instances, for temporarily buffering, and/or for caching of the information). In some embodiments, the non-transitory computer readable medium may be distributed across various computers and/or servers (e.g., provided via web services). Computer memory of computer readable storage mediums as referenced herein may include volatile and non-volatile or removable and non-removable media for a storage of electronic-formatted information such as computer readable program instructions or modules of computer readable program instructions, data, etc. that may be stand-alone or as part of a computing device. Examples of computer memory may include any other medium which can be used to store the desired electronic format of information and which can be accessed by the processor or processors or at least a portion of a computing device. In various embodiments, memory 120 may include an SD memory card, an internal and/or external hard disk, USB memory device, or similar modular memory.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may be compiled and stored in sequences of machine-readable code (in the case of C, C++, etc.) or as bytecode running on a virtual machine (in the case of Java). The code may also be passed through an interpreter, such as the Python interpreter. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

One or more medical exam review software applications 125 may be installed on computing device 110. The medical exam review applications 125 may include applications for viewing, reviewing, navigating through, and/or analyzing images included in a medical imaging exam, such as a radiology exam. When a radiologist conducts a review of the medical imaging exam, the radiologist may select a medical exam review application 125 to use to perform the review based on information of the exam (e.g., such as a type of the exam), such as selected exam review application 102.

In various embodiments, selected exam review application 102 may allow a user to view a plurality of medical images (e.g., radiology images) of the exam in accordance with a workflow 103. An exemplary portion of workflow 103 shown in FIG. 1A includes a first workflow step 104, a decision point 106, and a subsequent workflow step 108.

For the purposes of this disclosure, a workflow refers to a series of ordered steps carried out by a user on one or more medical images during a medical exam review task by a user (or an automated system). For example, a workflow may include a first workflow step where an exam stored on computing device 110 is loaded to review; a second workflow step where a selected exam review application 102 is loaded to open to review the medical exam; a third workflow step where a desired configuration of the selected exam review application 102 is selected; a fourth workflow step where a first series of images is viewed by the user; a fifth workflow step where the user performs an analysis of the first series of images using a tool; and so on. As indicated in workflow 103, one or more decision points may occur between steps of a workflow, where a decision point is a point in the workflow where a subsequent workflow step depends on a decision between one or more options for the subsequent workflow step.

For example, a first decision point may occur prior to the first workflow step where the user loads one or more exams to review, where the user is prompted to select an exam to load; a second decision point may occur prior to the second workflow step mentioned above where the user is prompted to select a medical exam review application 125 to load to review the selected medical exam; and so on. As described in greater detail below, at some decision points, the user may be prompted to select an option for a subsequent workflow step, and at other decision points, the user may not be prompted to select an option for a subsequent workflow step, and an option for a subsequent workflow step may be selected automatically (e.g., by an AI algorithm).

Computing device 110 may include an automated assistance service 130, which may provide automated, AI-based assistance at one or more decision points of workflow 103, such as at decision point 106. Automated assistance service 130 may include an assistive AI algorithm 132 that may be applied at decision point 106, for example, to predict a desired subsequent workflow step (e.g., workflow step 108). As described in greater detail below, assistive AI algorithm 132 may predict one or more preferred workflow options, and automatically select a predicted option. Alternatively, assistive AI algorithm 132 may prompt the user to select an option from the preferred workflow options. For example, the preferred workflow options may be displayed on the display of UI 140 for selection by the user.

One or more stored configurations 122 of automated assistance service 130 may be stored in memory 120. In various embodiments, the one or more stored configurations 122 may be used to configure assistive AI algorithm 132. The one or more stored configurations 122 may include configurations for different types of exams, or different types of users, or different types of workflows, or other kinds of configurations. For example, a first stored configuration 122 of assistive AI algorithm 132 may be used by a first radiologist, and a second stored configuration 122 may be used by a second radiologist; or a first stored configuration 122 may be used on a first anatomical region, and a second stored configuration 122 may be used on a second anatomical region. In various embodiments, the user may select a desired configuration (e.g., via UI 140) at a decision point of a workflow, such as decision point 106 of workflow 103.

Memory 120 may also include one or more context category/options matrices 124, which may be used by assistive AI algorithm 132 to predict a subsequent workflow step 108 at decision point 106. As described in greater detail below in reference to FIGS. 2A-2E, the one or more context category/options matrices 124 may include information regarding options designed specifically for decision point 106, options previously selected by peers at decision point 106, options selected locally in the past at decision point 106, options that are recommended at decision point 106 based on administrative guidelines, and/or other options.

The one or more context category/options matrices 124 may be periodically or regularly updated based on workflow options selected by users. To accomplish the periodic or regular updating, a user selection may be stored in a temporary decision buffer 134 of automated assistance service 130, where it may be retrieved by a local matrix updater 136 that updates one or more relevant context category/options matrices of the one or more context category/options matrices 124. Updating of the one or more relevant context category/options matrices is described in greater detail below in reference to FIG. 4.

A first flow of data through automated workflow assistance system 100 is indicated by a series of dashed lines. At decision point 106, selected exam review application 102 may trigger automated assistance service 130 to provide assistance with respect to deciding on subsequent workflow step 108, as indicated by a dashed line 107. Assistive AI algorithm 132 may retrieve one or more configurations 122 from memory 120 for configuring assistive AI algorithm 132, for example, based on the user, an exam type, and/or other characteristics of the workflow 103 or images reviewed as part of workflow 103, as indicated by a dashed line 121. Assistive AI algorithm 132 may retrieve one or more context category/options matrices 124 from memory 120 to be applied by assistive AI algorithm 132 to predict one or more options for subsequent workflow step 108, as indicated by a dashed line 123. Assistive AI algorithm 132 may display the one or more options in UI 140, as indicated by a dashed line 133, where user 150 may select a desired option, as indicated by a dashed line 141. The desired option may be returned to selected exam review application 102 at decision point 106, whereby selected exam review application 102 may initiate subsequent workflow step 108, as indicated by a dashed line 143.

FIG. 1B shows a second data flow diagram 160, indicating a second flow of data through automated workflow assistance system 100, also indicated by a series of dashed lines. As in FIG. 1A, at decision point 106, selected exam review application 102 may trigger automated assistance service 130 to provide assistance with respect to deciding on subsequent workflow step 108, and assistive AI algorithm 132 may retrieve one or more configurations 122 from memory 120 for configuring assistive AI algorithm 132. Assistive AI algorithm 132 may retrieve one or more context category/options matrices 124 from memory 120 to be applied by assistive AI algorithm 132 to predict one or more options for subsequent workflow step 108.

However, in FIG. 1B, assistive AI algorithm 132 may predict an option for a subsequent workflow step 108 with a probability that exceeds a threshold probability (e.g., an 80% likelihood of being selected by user 150). In some embodiments, the threshold probability may be an absolute probability, while in other embodiments, the threshold probability may be a relative probability with respect to other options for subsequent workflow step 108. For example, the threshold probability may be a threshold difference between a first probability of a most likely selected option and a second probability of a next most likely selected option.

As a result of the probability of the predicted subsequent workflow step 108 exceeding the threshold probability, assistive AI algorithm 132 may not display options in UI 140 for user 150 to select a desired option, and may automatically return the predicted subsequent workflow step 108 to selected exam review application 102 at decision point 106, as indicated by a dashed line 162, whereby selected exam review application 102 may initiate subsequent workflow step 108. By automatically selecting an option with a high predicted probability of selection, rather than displaying a list of options to the user from which to select, a time taken by the user to proceed through workflow 103 may be reduced.

In various embodiments, the automatically selected exam review application 102 may be rejected by the user, for example, if the user has a preference for a different medical exam review application 125 for workflow 103.

FIG. 1C shows a third data flow diagram 170, indicating a third flow of data through automated workflow assistance system 100, also indicated by a series of dashed lines. The third flow of data is a flow of feedback data sent back to automated assistance service 130, which may be used to update one or more context category/options matrices 124. For example, the third flow of data may occur after user 150 selects an option for decision point 106 via UI 140, as described above in reference to the first flow of data of FIG. 1A, indicated in FIG. 1C by dotted lines. By periodically or regularly updating the one or more context category/options matrices 124, an accuracy a performance of assistive AI algorithm 132 may be increased over time.

The third flow of data is initiated when user 150 selects a desired option for subsequent workflow step 108 in UI 140, as described above in reference to FIG. 1A. When the selected desired option is returned to selected exam review application 102 to initiate subsequent workflow step 108, the selected desired option may be sent back to automated assistance service 130, as indicated by a dashed line 172. In various embodiments, the selected desired option may be returned to selected exam review application 102 and sent back to automated assistance service 130 concurrently. At automated assistance service 130, the selected desired option may be stored in decision buffer 134. The selected desired option may be retrieved from decision buffer 134 by local matrix updater 136, as indicated by a dashed line 174. The local matrix updater 136 may then update one or more relevant and/or corresponding context category/options matrices 124, as described below in reference to FIG. 4.

FIG. 1D shows a fourth data flow diagram 180, indicating a fourth flow of data through automated workflow assistance system 100. The fourth flow of data may be initiated after assistive AI algorithm 132 automatically selects a most relevant option for subsequent workflow step 108, as described above in reference to the second flow of data of FIG. 1B and indicated in FIG. 1D by dotted lines. When assistive AI algorithm 132 returns subsequent workflow step 108 to selected exam review application 102, subsequent workflow step 108 may additionally be stored in decision buffer 134, as indicated by a dashed line 182. If user 150 accepts subsequent workflow step 108, subsequent workflow step 108 may be used by local matrix updater 136 to update the one or more context category/options matrices 124 as described above and indicated by dashed lines 184 and 186. Alternatively, user 150 may not accept subsequent workflow step 108, and may select a different subsequent workflow step 108. For example, the user may select a control in a UI of selected exam review application 102 to display a list of options for subsequent workflow step 108, and may select a desired option from the list to initiate the different subsequent workflow step 108. In some embodiments, the list of options may be generated by automated assistance service 130, as described above in reference to FIG. 1A. In other embodiments, the list of options may be generated by selected exam review application 102, or the different subsequent workflow step 108 may be selected in a different manner.

If user 150 does not accept subsequent workflow step 108, and selects the different subsequent workflow step 108, the different subsequent workflow step 108 may be sent to automated assistance service 130, where the different subsequent workflow step 108 may be stored in decision buffer 134, as indicated by a dashed line 188. For example, the different subsequent workflow step 108 may replace the initial subsequent workflow step 108 previously stored in decision buffer 134. The different subsequent workflow step 108 may then be used by local matrix updater 136 to update the one or more context category/options matrices 124 as described above and indicated by dashed lines 184 and 186. Thus, if user 150 overrides a first decision made by assistive AI algorithm 132 with a second decision made by user 150, information of the second decision may be used to update the one or more context category/options matrices 124, and information of the first decision may not be used to update the one or more context category/options matrices 124. Alternatively, if user 150 does not override the first decision, it may be inferred by automated assistance service 130 that user 150 has accepted the first decision made by made by assistive AI algorithm 132, whereby information of the first decision is used to update the one or more context category/options matrices 124.

Referring now to FIG. 2A, a context category/option matrix 200 is shown. Context category/option matrix 200 may be used by an assistive AI algorithm (e.g., assistive AI algorithm 132) to predict a probability of a workflow option being selected at a decision point of the workflow, as described above. In various embodiments, context category/option matrix 200 may be a 2-dimensional matrix in which a set of possible context categories are represented along a vertical axis of context category/option matrix 200, and a corresponding set of possible workflow options that may be selected for each context category are represented along a horizontal axis of context category/option matrix 200. In some embodiments, context category/option matrix 200 may be one of a plurality of context category/option matrices, that taken together, describe a multi-dimensional context. For example, a 3-dimensional context matrix may be described as three 2-dimensional matrices, where each 2-dimensional matrix represents a combination of two dimensions of the 3-dimensional context matrix.

As an example, the context categories may comprise a list of different types of medical exams that the user may review, and the options may comprise a list of different applications that may be used to review the different exam types, as seen in FIGS. 2B-2E. Alternatively, a different context category/option matrix 200 may include context categories comprising the list of different types of medical exams, and options comprising a list of different tools that may be used for reviewing the different exam types, or a list of different configurations that may be applied when reviewing the different exam types, or a list of different layouts that may be applied when reviewing the different exam types, or other types of options depending on the context categories.

Context category/option matrix 200 may include a plurality of individual entries 202, where each individual entry 202 corresponds to a column indicating an option, and a row indicating a context category. Each individual entry 202 of context category/option matrix 200 may include a value. The value assigned to an individual entry 202 may be used by an assistive AI algorithm (e.g., assistive AI algorithm 132) to determine a suitability of an option indicated by a column of the relevant individual entry 202 for a corresponding context category indicated by a row of the relevant individual entry 202. The value may indicate a degree of suitability, such as a percentage, where the percentage indicates whether the degree of suitability is relatively high or relatively low. In other embodiments, the value may be an encoding that indicates a suitability of an option. For example, the value may be a 1 or a 0, where the 1 indicates that an option is suitable for a corresponding context category, and the 0 indicates that the option is not suitable for a corresponding context category. In still further embodiments, the value may be an encoding that indicates a level of suitability of an option. For example, the value may be a ranking from 1 to 5, where the 1 indicates that an option is least suitable for a corresponding context category, and the 5 indicates that the option is most suitable for a corresponding context category. It should be appreciated that the examples described herein are included for illustrative purposes, and other or different types of values or encodings may be used without departing from the scope of this disclosure.

As an example, an individual entry 208 may include a value of 90, which may indicate that an option 11 corresponding to an 11th column 206 of context category/option matrix 200 has a 90% probability of being the preferred option for a context category 7 corresponding to a $7^{th}$ row 204 of context category/option matrix 200. As a result of option 11 having a 90% probability of being the preferred option for a context category 7, the assistive AI algorithm may select option 11 for context category 7. Alternatively, individual entry 208 may include a value of 10, which may indicate that option 11 has a 10% probability of being the preferred option for a context category 7. As a result of option 11 having a 10% probability of being the preferred option for a context category 7, the assistive AI algorithm may not select option 11 for context category 7.

Additionally, to predict a probability of a workflow option being selected at a decision point of the workflow, the assistive AI algorithm may consult and or combine a plurality of context category/option matrices 200. For example, if the context categories are exam types, and the options are applications, the assistive AI algorithm may consult a first context category/option matrix 200 to determine a first set of applications available to review a selected type of exam; the assistive AI algorithm may consult a second context category/option matrix 200 to determine a second set of applications applicable to reviewing the selected type of exam; the assistive AI algorithm may consult a third context category/option matrix 200 to determine a third set of applications preferred by the user for reviewing the type of exam; the assistive AI algorithm may consult a fourth context category/option matrix 200 to determine a fourth set of applications that may have been used by peers of the user to review the type of exam; and so on. An appropriate application may then be selected by the assistive AI algorithm based on the first, second, third, fourth, and/or additional sets determined by the context category/option matrices 200. In some embodiments, the different context category/option matrices 200 may be consulted individually and/or sequentially by the assistive AI algorithm, for example, to iteratively refine a list of candidate applications, or to define degrees of relevance of an application, or to assign priorities to candidate applications (e.g., to determine whether a candidate application may be automatically selected). In other embodiments, the assistive AI algorithm may combine the different context category/option matrices 200 to predict a workflow option, where a combination of the different context category/option matrices 200 may depend on a configuration (e.g., a configuration 122 of FIGS. 1A-1D) of the assistive AI algorithm. For example, the configuration may be a customized configuration of the user.

FIGS. 2B-2E show a set of context category/option matrices 200 that may be consulted by the assistive AI algorithm at a decision point in a workflow to determine a suitable application to use to review a selected exam. FIG. 2B shows an intended use exam type/application matrix 210, where a first list of exam types is shown in rows along a Y axis of intended use exam type/application matrix 210, and various applications available to the user to review the different exam types are shown in columns along an X axis of intended use exam type/application matrix 210. Intended use exam type/application matrix 210 may include a list of applications that are intended (e.g., by a designer or engineer of a relevant application) to be used to review one or more of the included exam types. Each individual entry of intended use exam type/application matrix 210 may include a value representing a suitability of an application with a corresponding exam type. In various embodiments, the list of available applications may be a list of applications that the user or a healthcare organization of the user has purchased or subscribed to.

For example, a row 212 of intended use exam type/application matrix 210 corresponds to an exam type 3 of the list of exam types. (To avoid confusion, other values of other rows of intended use exam type/application matrix 210 are not shown.) For each individual entry of row 212, a value may be assigned, where the value may indicate a suitability of an application of a corresponding column for reviewing an exam of exam type 3. For example, in some embodiments, the values of intended use exam type/application matrix 210 may correspond to an encoding from 0 to 4. 0 may indicate that an application is unsuitable for exam type 3; 4 may indicate that the application is highly suitable, or most suitable, for exam type 3; and the numbers 1, 2, and 3 may indicate various degrees of suitability of the application for exam type 3. In other embodiments, a different encoding may be used, or the values may represent a percentage of suitability, or the values may represent something else.

As an example, a value of 4 is assigned to an individual entry 214, where individual entry 214 corresponds to a fifth application (e.g., application 5) of the list of available applications. A value of 0 is assigned to an individual entry 216, where individual entry 216 corresponds to an eighth application (e.g., application 8) of the list of available applications. Other values of row 212 range between 0 and 3. Based on the value of 0 assigned to individual entry 216, the assistive AI algorithm may determine that application 8 is not suitable for reviewing exam type 3. Application 8 may not be designed for and/or intended to be used on exam type 3. For example, application 8 may be designed for reviewing images of a heart of a patient, and exam type 3 may correspond to a brain of a patient.

Based on the value of 4 assigned to individual entry 214, the assistive AI algorithm may determine that application 5 is highly suitable for reviewing exam type 3. Application 5 may be designed for and/or intended to be used on exam type 3. For example, application 5 may be designed for reviewing images of a heart of a patient, and exam type 3 may correspond to a heart of a patient. Further, based on the other values included in row 212, the assistive AI algorithm may determine that applications 7-10, which are assigned values of 0, are unsuitable for exam type 3. The assistive AI algorithm may determine that application 1, which is assigned a value of 1, is moderately unsuitable for exam type 3. The assistive AI algorithm may determine that applications 4 and 6, which are assigned values of 2, are moderately suitable for exam type 3. The assistive AI algorithm may determine that application 3, which is assigned a value of 3, is suitable for exam type 3. The assistive AI algorithm may thus determine that application 5 is the most suitable application for reviewing exam type 3, due to the value (e.g., 4) assigned to individual entry 214 being higher than the other values. As a result of application 5 being assigned the highest value for exam type 3, if a selected exam is determined to be of exam type 3, the assistive AI algorithm may select application 5 as a candidate application for reviewing the selected exam.

FIG. 2C shows a peer usage exam type/application matrix 230, where a second list of exam types is plotted along a Y axis of peer usage exam type/application matrix 230, and various applications used by peers of the user to review the different exam types are shown in columns along an X axis of peer usage exam type/application matrix 230. In some embodiments, the peers may be local peers of the user, where the local peers work with the user within a same healthcare facility, or organization, or in some other capacity. In other embodiments, the peers may be regional, or global peers of the user, where the peers are users similar to the user, or other users of similar applications. In various embodiments, the peers may be predefined by an administrator of a relevant organization. In some embodiments, the peers may be identified using AI clustering algorithms that identify users having activities, workflows, or making similar decisions.

The second list of exam types may be the same as the first list of exam types, or the second list of exam types may be different from the first list of exam types, or the second list of exam types may be a subset of the first list of exam types. Similarly, the various applications shown in the columns of the X axis may be the same as, different from, a subset of, or may include one or more of the applications shown in intended use exam type/application matrix 210 of FIG. 2B. In FIG. 2C, a smaller set of applications is shown than in FIG. 2B. Specifically, applications 7-10 are not shown. In some embodiments, applications 7-10 may not be shown because applications 7-10 may have been excluded from consideration for exam type 3, and therefore values of peer usage exam type/application matrix 230 corresponding to applications 7-10 may have been deleted from working memory during processing of the values of peer usage exam type/application matrix 230 to increase a speed of the assistive AI algorithm. In other embodiments, the applications 7-10 may not be shown because the user does not have access to the applications 7-10, or because the user is not trained on the applications 7-10.

For example, in response to a user loading an exam of exam type 3, in a first step, the assistive AI algorithm may consult intended use exam type/application matrix 210 to determine which available applications are intended for use with exam type 3. As a result of consulting intended use exam type/application matrix 210, the assistive AI algorithm may determine that applications 7-10 are not suitable for reviewing exam type 3, as described above in reference to FIG. 2B. The assistive AI algorithm may subsequently consult peer usage exam type/application matrix 230 to determine which applications left in the available applications (e.g., from intended use exam type/application matrix 210) are preferred by peers for reviewing exams of exam type 3. Because applications 7-10 have been excluded from consideration as a result of consulting intended use exam type/application matrix 210, applications 7-10 may not be shown (e.g., where applications 7-10 are grayed out in FIG. 2C).

In FIG. 2C, a row 232 of peer usage exam type/application matrix 230 corresponds to exam type 3, which may be the same as the exam type 3 of intended use exam type/application matrix 210 of FIG. 2B. For each individual entry of row 232, a value may be assigned based on a perceived preference of an application for a reviewing exam type 3, based on a usage of the application by peers of the user. In various embodiments, the value may indicate a percentage of peers that use a corresponding application to review exam type 3. In other words, a low value may indicate that relatively few peers use the application to review exam type 3, and a high value may indicate that many peers use the application to review exam type 3. In other embodiments, an encoding similar to FIG. 2B may be used, or the values may represent something else.

As an example, in FIG. 2C, a value of 2 is assigned to an individual entry 234, where individual entry 234 corresponds to an application 2 of the various applications listed along the X axis. A value of 34 is assigned to an individual entry 236, where individual entry 236 corresponds to an application 5 of the various applications listed along the X axis. Other values of row 232 range between 0 and 100. Based on the value of 2 assigned to individual entry 234, the assistive AI algorithm may determine that a very small number of peers (e.g., 2%) use application 2 for reviewing exam type 3. Based on the value of 34 assigned to individual entry 236, the assistive AI algorithm may determine that a substantial number of peers (e.g., 34%) use application 5 for reviewing exam type 5.

Based on all the values included in row 232, the assistive AI algorithm may determine that applications 1 and 2, which are assigned values of 8 and 2, are relatively unpopular among peers for exam type 3. The assistive AI algorithm may determine that applications 3, 4, and 6, which are assigned values between 10 and 20, are relatively popular among peers for exam type 3. The assistive AI algorithm may determine that application 5 is most popular among peers for exam type 3, which a highest percent of peers use (e.g., 34%). As a result of consulting peer usage exam type/application matrix 230, the assistive AI algorithm may determine that applications 1 and 2 do not represent suitable candidates for reviewing a selected exam of exam type 3, and that applications 3-6 do represent suitable candidates for reviewing a selected exam of exam type 3, with application 5 being the most suitable.

FIG. 2D shows a local usage exam type/application matrix 260, where a third list of exam types is plotted along a Y axis of local usage exam type/application matrix 260, and the columns of local usage exam type/application matrix 260 represent various applications used locally by the user to review the different exam types. The third list of exam types may be the same as, different from, or may include one or more exam types of the first and second lists of exam types, and the applications shown in the columns of the X axis may be the same as, different from, a subset of, or may include one or more of the applications shown in the intended use exam type/application matrix 210 of FIG. 2B and/or the peer usage exam type/application matrix 230 of FIG. 2C.

In FIG. 2D, a row 262 of local usage exam type/application matrix 260 corresponds to an exam type 3, which may be the same as the exam type 3 of intended use exam type/application matrix 210 of FIG. 2B and/or peer usage exam type/application matrix 230 of FIG. 2C. For each individual entry of row 262, a value may be assigned, where the value may indicate a suitability of an application to review exam type 3 based on a frequency with which the application is used locally (e.g., at a location of the user, such as at a health care facility or organization of the user). In other words, a low value may indicate that a corresponding application is used locally to review exam type 3 infrequently, and a high value may indicate that the corresponding application is used to review exam type 3 frequently. For example, the values assigned to local usage exam type/application matrix 260 may be relative percentages of time during which the corresponding application has been used locally. In other embodiments, an encoding similar to FIG. 2B may be used, or a different kind of encoding may be used.

The third list of exam types may be the same as the first list of exam types and/or the second list of exam types, or the third list of exam types may be different from the first and second lists of exam types, or the third list of exam types may be a subset of the first and/or second list of exam types. Similarly, the various applications shown in the columns of the X axis may be the same as, different from, a subset of, or may include one or more of the applications shown in intended use exam type/application matrix 210 of FIG. 2B. In FIG. 2D, a smaller set of applications is shown than in FIG. 2C. Specifically, applications 1 and 2 are not shown. As described above, applications 1 and 2 may not be shown because applications 1 and 2 may have been excluded from consideration for exam type 3. As a result of being excluded, values of local usage exam type/application matrix 260 corresponding to applications 1 and 2 may have been deleted from memory during processing of the values of local usage exam type/application matrix 260 to increase a speed of the assistive AI algorithm.

For example, in response to a user loading an exam of exam type 3, in a first step, the assistive AI algorithm may consult intended use exam type/application matrix 210 to determine which available applications are intended for use with exam type 3. As a result of consulting intended use exam type/application matrix 210, the assistive AI algorithm may determine that applications 7-10 are not suitable for reviewing exam type 3, as described above. The assistive AI algorithm may subsequently consult peer usage exam type/application matrix 230 to determine which applications left in the available applications (e.g., from intended use exam type/application matrix 210) are preferred by peers for reviewing exams of exam type 3. As a result of applications 1 and 2 not representing suitable candidates for reviewing a selected exam of exam type 3, as described above, applications 1 and 2 may be excluded from consideration in local usage exam type/application matrix 260 (e.g., where applications 1 and 2 are grayed out in FIG. 2D).

In FIG. 2D, a value of 42 is assigned to an individual entry 264, where individual entry 264 corresponds to an application 5 of the various applications listed along the X axis. A value of 14 is assigned to an individual entry 266, where individual entry 266 corresponds to an application 4 of the various applications listed along the X axis. Other values of row 262 range between 0 and 100. Based on the value of 42 assigned to individual entry 264, the assistive AI algorithm may determine that locally, application 5 is frequently used for reviewing exam type 3. Based on the value of 14 assigned to individual entry 266, the assistive AI algorithm may determine that locally, application 4 is infrequently used for reviewing exam type 3.

Based on all the values included in row 262, the assistive AI algorithm may determine that locally, application 5 is used most of the time for exam type 3 (e.g., 42% of the time). As a result of consulting local usage exam type/application matrix 260, the assistive AI algorithm may determine that while applications 3, 4, 5, and 6 are all used for reviewing a selected exam of exam type 3, applications 5 and 6 may be more suitable candidates for reviewing a selected exam of exam type 3 than applications 3 and 4.

FIG. 2E shows a local configuration exam type/application matrix 280, where a fourth list of exam types is plotted along a Y axis of local configuration exam type/application matrix 280, and the columns of local configuration exam type/application matrix 280 represent various applications applicable to reviewing the different exam types. The fourth list of exam types may be the same as, different from, or may include one or more exam types of the first, second, and third lists of exam types, and the applications shown in the columns of the X axis may be the same as, different from, a subset of, or may include one or more of the applications shown in the intended use exam type/application matrix 210 of FIG. 2B, peer usage exam type/application matrix 230 of FIG. 2C, and/or local usage exam type/application matrix 260 of FIG. 2D.

In FIG. 2E, a row 282 of local configuration exam type/application matrix 280 corresponds to an exam type 3, which may be the same as the exam type 3 of intended use exam type/application matrix 210 of FIG. 2B, peer usage exam type/application matrix 230 of FIG. 2C, and/or local usage exam type/application matrix 260. For each individual entry of row 282, a value may be assigned, where the value may indicate whether or not a corresponding application is recommended for reviewing exam type 3. In various embodiments, the value may be a binary encoding (e.g., either a 1 or a 0). In other words, a 0 may indicate that the corresponding application is not recommended to review exam type 3, and a 1 may indicate that the corresponding application is recommended for reviewing exam type 3. In other embodiments, the values assigned to local configuration exam type/application matrix 280 may be a different type of encoding. For example, a value between 1 and 10 may be used to indicate varying degrees to which the corresponding application is recommended for reviewing exam type 3, or a 0 may indicate that a corresponding application may not be used, a 1 may indicate that the corresponding application may be used, and a 2 may indicate that the corresponding application should be used, or the values may represent something else.

The fourth list of exam types may be the same as the first, second, and/or third list of exam types, or the fourth list of exam types may be different from the first, second, and third lists of exam types, or the fourth list of exam types may be a subset of the first, second list, and/or third lists of exam types. Similarly, the various applications shown in the columns of the X axis may be the same as, different from, a subset of, or may include one or more of the applications shown in intended use exam type/application matrix 210 of FIG. 2B, peer usage exam type/application matrix 230 of FIG. 2C, and/or local usage exam type/application matrix 260 of FIG. 2D. In FIG. 2E, the same set of applications is shown as in FIG. 2D.

In FIG. 2E, a value of 1 is assigned to an individual entry 284, where individual entry 284 corresponds to an application 5 of the various applications listed along the X axis. The value of 1 may indicate that application 5 is recommended for exam type 3. Other values of row 282 range are assigned 0 s. Based on the value of 1 assigned to individual entry 284 and the other values of row 282 being 0 s, the assistive AI algorithm may determine that locally, application 5 is recommended for reviewing exam type 3 over applications 3, 4, and 6.

Thus, if an exam of exam type 3 is selected and loaded by a user onto a computing device (e.g., computing device 110 of FIG. 1A) for reviewing, an assistive AI algorithm of an automated workflow assistance system (e.g., automated workflow assistance system 100) may predict an appropriate application to load to review the exam. In the embodiment described above, in a first step, the assistive AI algorithm may consult the intended use exam type/application matrix 210 of FIG. 2B, and may determine a first set of candidate applications based on an intended use of a larger number of available applications. In a second step, the assistive AI algorithm may consult the peer usage exam type/application matrix 230 of FIG. 2C, and may refine the first set of candidate applications into a second, smaller set of candidate applications based on a usage of the first set of candidate applications by peers of the user. In a third step, the assistive AI algorithm may consult the local usage exam type/application matrix 260 of FIG. 2D, and may further refine the second set of candidate applications into a third set of candidate applications based on a local usage of the second set of candidate applications. In a fourth step, the assistive AI algorithm may consult the local configuration exam type/application matrix 280 of FIG. 2E to determine a recommended candidate application of the third set of candidate applications. If a candidate application is recommended, the automated workflow assistance system may automatically load the recommended candidate application, as described above in reference to FIG. 1B. If more than one candidate application is recommended, the automated workflow assistance system may display the more than one recommended candidate application in a display of the computing device (e.g., UI 140) for the user to select a preferred candidate, as described above in reference to FIG. 1A. In this way, by iteratively refining a list of candidate applications using a plurality of exam type/application matrices, the assistive AI algorithm may aid the user in determining and selecting a desired application to view the loaded exam. Further, each time a set of options (e.g., applications) is refined to a smaller set, values of a corresponding matrix may be excluded and deleted from working memory during processing, to increase a speed and efficiency of the automated workflow assistance system.

Thus, a recommendation model is proposed for recommending a small set of certain options to a user, and not recommending a larger set of other options to the user, where the recommendation model is based on a specific type of matrix-based data structure designed to improve the way a computer retrieves data regarding options from memory, and increase a speed at which the data is processed by the assistive AI algorithm. The recommendation model relies on a simplistic, matrix-combination code that is easy to maintain and extend to introduce new recommendation strategies. The context category/option matrices provide a specific implementation of a solution to generating a preferred set of options from a larger general set of options in real time, thus improving the operation of the computing device. Accordingly, the context category/option matrices disclosed herein are not simply directed to any form of storing option data, but instead are specifically directed to a set of data matrices, where each data matrix of the set of data matrices includes a portion of the option data, and the preferred set of options may be generated by consulting one or more data matrices in accordance with a set of rules defined in a loaded configuration file. In contrast, alternative recommendation models that rely on high-dimensional statistical algorithms or neural network architectures typically rely on collecting, storing, and manipulating large amounts of data in memory when generating the preferred set of options. As a result, the alternative recommendation models may consume more resources of the computing device, leaving less resources available for other applications running on the computing device. Because of the greater use of resources (e.g., processing power and memory) of the alternative recommendation models with respect to the recommendation model described herein, an amount of time taken by the alternative recommendation models to generate the preferred set of options may not be generated in real time without delays, where the user may have to wait for the preferred set of options to be generated.

It should be appreciated that in in other embodiments, a number and/or order of exam type/application matrices consulted by the assistive AI algorithm may be different. Additionally, the exam type/application matrices consulted by the assistive AI algorithm may be combined or consulted in a different manner to determine one or more recommended candidate applications. How the exam type/application matrices are consulted by the assistive AI algorithm is described further below in reference to FIG. 3.

Figure 3:
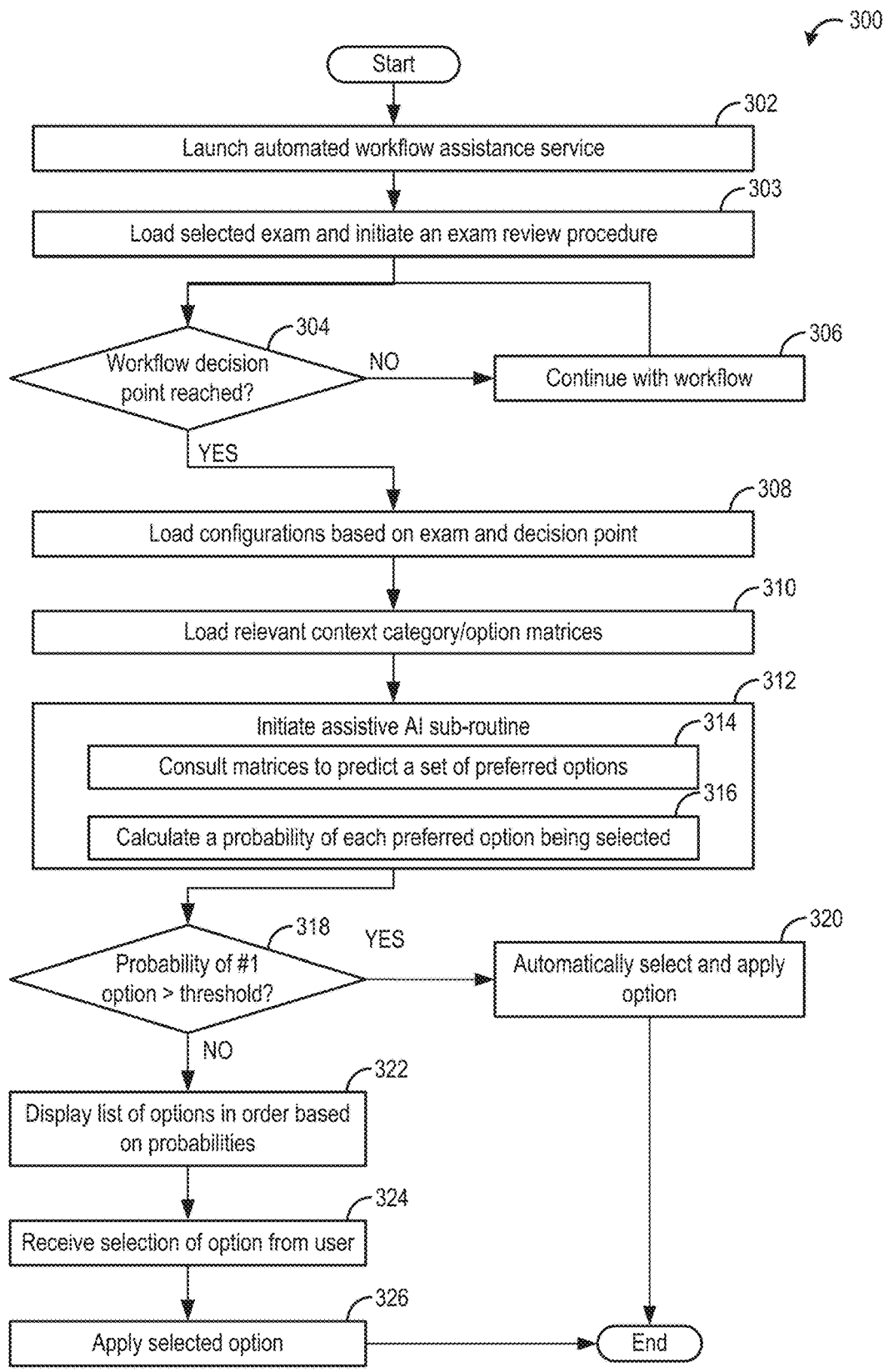
FIG. 3 is a flowchart illustrating an exemplary method for providing automated decision assistance in a workflow of a software application, in accordance with one or more embodiments of the present disclosure.

Referring now to FIG. 3, an exemplary method 300 is shown for providing automated decision assistance to a user of a computing device, when the user is reviewing one or more medical exams via one or more software applications installed on the computing device. The automated decision assistance may be provided during decision points of a workflow of the user via an automated workflow assistance service. Method 300 and other methods described herein are described with reference to a workflow assistance system, such as workflow assistance system 100 of FIG. 1A. Method 300 may be implemented via computer-readable instructions stored in a memory of the computing device, and executed by a processor of the computing device, such as memory 120 and processor 115 of computing device 110 of FIG. 1A.

Method 300 begins at 302, where method 300 includes launching an automated workflow assistance service installed on the computing device. In some embodiments, the automated workflow assistance service may be launched by the user by double-clicking on an icon in a UI of the computing device. In other embodiments, the automated workflow assistance service may be launched in a different way. For example, the automated assistance service may be launched by selecting an item in a menu displayed in the UI, or launched in response to a verbal command from the user received at a microphone of the computing device. The user may launch the automated workflow assistance service in anticipation of reviewing a medical exam, in order to receive assistance in navigating a series of steps of a workflow entailed by reviewing the medical exam.

At 303, method 300 includes loading a medical exam selected by the user into the automated workflow assistance service and initiating a procedure for reviewing the medical exam (e.g., starting the workflow). As described above, the workflow may include a series of clinical tasks to be performed, where the clinical tasks may be selected at various decision points of the workflow. In various embodiments, the selected exam may be an exam selected by the user via a menu of the automated workflow assistance service. The menu may be displayed in a UI of the computing device (e.g., UI 140). For example, the user may launch the automated workflow assistance service, and upon the launch, the automated workflow assistance service may prompt the user to select a medical exam to review via a pop-up dialog box displayed in the UI, where the dialog box includes the menu. Alternatively, the user may launch the automated workflow assistance service in a first step, and in a second step, the user may double click on an icon of a relevant medical exam displayed in the UI. When the icon is double clicked, the relevant medical exam may be loaded into the automated workflow assistance service. In other embodiments, a medical exam may be selected by the user and loaded into the automated workflow assistance service in a different manner.

At 304, method 300 includes determining whether a decision point in the workflow has been reached. The decision point in the workflow may be reached when the automated workflow assistance service requests input from the user regarding a subsequent step of the workflow (e.g., a subsequent step of the procedure for reviewing the medical exam). For example, a first decision point may occur after the medical exam is loaded into the automated workflow assistance service, where at the first decision point, the user is requested to select a suitable medical exam review application to review the exam. Subsequent decision points of the workflow may occur when, for example, the user is requested to select a configuration of the suitable medical exam review application, or a preferred layout of a UI of the suitable medical exam review application, or to select one or more tools of the suitable medical exam review application, and/or other similar tasks.

If at 304 it is determined that a decision point in the workflow has not been reached, method 300 proceeds to 306. At 306, method 300 includes continuing with the workflow, and method 300 proceeds back to 304. Alternatively, if at 304 it is determined that a decision point in the workflow has been reached, method 300 proceeds to 308.

At 308, method 300 includes loading one or more configurations (e.g., configurations 122) of the automated workflow assistance service. The configurations may be based on the exam and the decision point of the workflow. For example, at a decision point where an application is to be selected to review the exam, a first configuration may be loaded that references information relative to applications used to review the exam. Alternatively, at a decision point where a layout of the application is to be selected, a second configuration may be loaded that references information relative to various layout options of the application.

The configurations may be based on the type of the exam. For example, a first configuration may be loaded for a first exam on a first anatomical region of a patient (e.g., a heart of the patient), and a second configuration may be loaded for a second exam on a second anatomical region of a patient (e.g., a liver of the patient). Alternatively, the configurations may be based on a type of technology or modality used to acquire images of the patient, where a first configuration may be used for a first type of technology or modality, and a second configuration may be used for a second type of technology or modality. In other embodiments, a configuration may be a preferred configuration of a user, or a group of users. For example, the configurations may be customizable, where a first user may save a first preferred configuration, a second user may save a second preferred configuration, and so on. Further, a plurality of customizable configurations may be saved for a user, where a user may select a first customizable configuration for a first type of exam, and the user may select a second customizable configuration for a second type of exam, where the first customizable configuration may be different from one or more customizable configurations of other users for the first type of exam, and the second customizable configuration may be different from one or more customizable configurations of other users for the second type of exam.

A loaded configuration may be used by an assistive AI algorithm of the automated workflow assistance service to retrieve data stored in a memory of the computing device to support a decision of the user at a decision point. For example, a configuration may indicate a set of relevant context category/option matrices to be loaded from memory, which may be supplied as input into the assistive AI algorithm to provide appropriate assistance to the user. The configuration may also establish automation thresholds, for determining whether an option should be included in a set of preferred options.

In some embodiments, a configuration may be used to define and/or tune a prediction mode of the automated workflow assistance service. The prediction mode may define a combination logic between different context category/option matrices based on preferences of the user or an administrator of a healthcare organization of the user. For example, a first prediction mode may specify that automated assistance provided to a user should be based on a practice of the user, where relevant options outside the user's current practice are not included in the automated assistance provided. A second prediction mode may specify that the relevant options outside the user's current practice should be included in the automated assistance provided. A third prediction mode may specify that the automated assistance provided should include best practice options not currently leveraged by the user. Additionally, a fourth prediction mode may be established by the administrator, where the fourth prediction mode may enforce the use of certain options for certain context categories. In this way, a performance of the automated assistance may be tailored to personal or institutional demands.

At 310, method 300 includes loading one or more relevant context category/option matrices. As described above in reference to FIGS. 2A-2E, the one or more relevant context category/option matrices may include information regarding the suitability of various different options for a corresponding set of context categories (e.g., different procedural options to be selected by the user at a decision point in the workflow for a corresponding set of criteria).

At 312, method 300 includes initiating an assistive AI subroutine of the automated workflow assistance service, where during the assistive AI subroutine, the assistive AI algorithm is applied to the one or more relevant context category/option matrices. At 314, applying the assistive AI algorithm to the one or more relevant context category/option matrices may include consulting information included in the one or more relevant context category/option matrices to predict a set of one or more preferred options at the decision point, as described above in reference to FIGS. 2A-2E. In various embodiments, the information included in the one or more relevant context category/option matrices may be consulted in accordance with a configured prediction procedure, where the configured prediction procedure is a procedure established in a relevant configuration (e.g., loaded at 308) for predicting the one or more preferred options.

For example, at a first decision point of the workflow, the user may be requested to select a suitable application to review a loaded medical exam. At the first decision point, a configuration of the automated workflow assistance service may be loaded that supports a prediction of a suitable application to load. Based on the configuration, a set of context category/option matrices may be loaded that include information relative to selecting the suitable application. For example, the configuration may establish that the set of context category/option matrices includes a first intended use exam type/application matrix, a second or usage exam type/application matrix, a third local usage exam type/application matrix, and a fourth local configuration exam type/application matrix, as described above in reference to intended use exam type/application matrix 210 of FIG. 2B, peer usage exam type/application matrix 230 of FIG. 2C, local usage exam type/application matrix 260 of FIG. 2D, and local configuration exam type/application matrix 280 of FIG. 2D, respectively. Upon initiation of the assistive AI subroutine of the automated workflow assistance service, the set of context category/option matrices may be consulted in a manner prescribed by the loaded configuration. For example, the loaded configuration may indicate to the assistive AI algorithm that the first intended use exam type/application matrix should be consulted first, to generate a first set of candidate applications for reviewing the exam based on an intended use of the applications. As a result of consulting the first intended use exam type/application matrix first, one or more applications of a plurality of available applications may be eliminated from consideration due to not being intended for reviewing the loaded exam.

The loaded configuration may indicate to the assistive AI algorithm that the second peer usage exam type/application matrix should be consulted second, to generate a second set of candidate applications for reviewing the exam based on a frequency of use of the applications by peers of the user. As a result of the one or more applications being eliminated based on the intended use of the applications, values of the one or more eliminated application options may be deleted from a Random Access Memory (RAM) of the computing device, thereby reducing an amount of processing performed by the assistive AI algorithm during consultation of the peer usage exam type/application matrix. As a result of consulting the second peer usage exam type/application matrix, one or more applications of the first set of candidate applications may be eliminated from consideration due to not being frequently used by peers for reviewing the loaded exam.

The loaded configuration may indicate to the assistive AI algorithm that the third local usage exam type/application matrix should be consulted third, to generate a third set of candidate applications for reviewing the exam based on a frequency of use of the applications by other users at a location of the user. As a result of the one or more applications being eliminated based on the use of the applications by peers, values of the one or more eliminated applications may be deleted from the RAM of the computing device, thereby reducing an amount of processing performed by the assistive AI algorithm during consultation of the local usage exam type/application matrix. As a result of consulting the third local usage exam type/application matrix, one or more applications of the second set of candidate applications may be eliminated from consideration due to not being frequently used locally for reviewing the loaded exam.

The loaded configuration may indicate to the assistive AI algorithm that the fourth local configuration exam type/application matrix should be consulted fourth, to generate a fourth set of candidate applications for reviewing the exam based on administrative and/or recommendation guidelines, for example, that may be issued by a health care organization of the user. As a result of the one or more applications being eliminated based on the local use of the applications at the location of the user, values of the one or more eliminated applications may be deleted from the RAM of the computing device, thereby reducing an amount of processing performed by the assistive AI algorithm during consultation of the local configuration exam type/application matrix. As a result of consulting the fourth local configuration exam type/application matrix, one or more applications of the third set of candidate applications may be eliminated from consideration due to not being recommended locally for reviewing the loaded exam.

In this way, each context category/option matrix of the set of context category/option matrices may be consulted in order, to iteratively refine a set of options that may be selected by the user at the decision point. After consulting each context category/option matrix of the set of context category/option matrices, a set of preferred options may be generated for the user that is smaller than the plurality of options available to the user. Further, by iteratively consulting each context category/option matrix in order, and eliminating unsuitable options based on each consultation, a number of computations performed by the assistive AI algorithm may be reduced, increasing the efficiency of the automated workflow assistance service. As a result of the increased efficiency, a larger number of available options may be considered by the assistive AI algorithm, without introducing a delay in a responsiveness of the computing device.

At 316, method 300 includes calculating a probability of each preferred option of the set of preferred options being selected. In various embodiments, the probability of each preferred option may be calculated by the assistive AI algorithm in accordance with instructions established in the loaded configuration. The probability of each preferred option may be calculated based on values included in the one or more context category/option matrices, as well as a relative weighting of the one or more context category/option matrices.

For example, when predicting a probability of a candidate application being selected for a specified exam type, instructions may be included in the loaded configuration to assign probabilities to the application options of each subsequent set of preferred options generated by the assistive AI algorithm. In other words, in reference to the first set of preferred options generated by the assistive AI algorithm using the intended use exam type/application matrix, a probability of each application option for a given exam type may be generated based on corresponding values of the application option in the intended use exam type/application matrix. In reference to the second set of preferred options generated by the assistive AI algorithm using the peer usage exam type/application matrix, a probability of each application option may be generated based on corresponding values of the application option in the peer usage exam type/application matrix. In reference to the third set of preferred options generated by the assistive AI algorithm using the local usage exam type/application matrix, a probability of each application option may be generated based on corresponding values of the application option in the local usage exam type/application matrix. In reference to the fourth set of preferred options generated by the assistive AI algorithm using the local configuration exam type/application matrix, a probability of each application option may be generated based on corresponding values of the application option in the local configuration exam type/application matrix.

For each of the first, second, third, and fourth sets of preferred options, the probabilities of application options being selected may be calculated in the same way, or in different ways. For example, for some sets of preferred options, the relevant values may be percentages, where the probabilities may be based on the percentages or generated as a function of the percentages. For other sets of preferred options, the relevant values may be encodings, where probabilities may be a function of the encodings. Alternatively, the probabilities may be generated based on one or more rule-based algorithms that consider criteria outside of the encodings. The rule-based algorithms may consider and/or compare values from multiple matrices. In some embodiments, the rule-based algorithms may be developed by one or more human experts, who may assign weightings to different matrices. For example, a rule-based algorithm generated by a human expert may consider that peer usage of an application option is a more reliable predictor of the application option being selected than local usage of the application option, whereby calculating a probability of the application option being selected may include weighting a value assigned to the application option in the peer usage exam type/application matrix more heavily than a value assigned to the application option in the local usage exam type/application matrix. In some embodiments, a conversion of encodings into probabilities, and a combination of matrices may be converted into arithmetic expressions with parameters, where machine learning and/or deep learning models may be trained to learn a most efficient set of parameters for each decision point and/or mode. A type of institution and/or a user role may also be characterized and taken into account. Further, the values of the matrices, the rule-based algorithm, and/or the criteria used to calculate the probabilities may be adjusted over time based on user selections and/or user acceptance of automatic selections. The updating and adjusting of values, algorithms, and/or criteria is described in greater detail below in reference to FIG. 4.

At 318, method 300 includes determining whether a probability of an option being selected for a given context category exceeds a threshold probability. If the probability of the option being selected exceeds the threshold probability, at 320, method 300 includes automatically selecting and applying the option. For example, if the option is an application to load to review an exam of a given exam type, method 300 may include automatically selecting the application and loading the selected application on the computing device. Automatically selecting and loading the application may include not prompting the user to select and load a preferred application.

In some embodiments, the threshold probability may be an absolute probability. For example, if a probability of an option exceeds a threshold probability of 80% (e.g., where the probability of other options amount to less than 20%), the option may be automatically selected and loaded. In other embodiments, the threshold probability may be a threshold difference between a probability of a first option and a probability of a second option, where the first option is a most probable option, and the second option is a next most probable option. For example, the threshold difference may be 20%, where if the most probable option has a probability of being selected of 50%, and the second most probable option has a probability of being selected of 29%, then the difference between the probability of the most probable option and the probability of the second most probable option is 21%, whereby the most probable option may be selected. However, if the second most probable option has a probability of being selected of 32%, then the difference between the probability of the most probable option and the probability of the second most probable option is 18%, whereby the most probable option may not be selected.

If at 318 it is determined that the probability of an option being selected for a given context category does not exceed the threshold probability, then method 300 proceeds to 322. At 322, method 300 includes displaying a set of preferred options to the user on a display of the computing device, within a UI of the automated workflow assistance service. The set of preferred options may be a final set of preferred options generated by the assistive AI algorithm, after consulting a plurality of context category/option matrices, as described above. In some embodiments, the set of preferred options may be generated in a different manner. For example, the set of preferred options may be a set of preferred options generated by a single context category/option matrix that is weighted more than other context category/options matrices. The set of preferred options may also be a set of options generated by combining various context category/option matrices in a non-sequential manner.

In various embodiments, displaying the set of preferred options to the user may include displaying the set of preferred options in an order, where the order may be determined by the probabilities of the individual options included in the set of preferred options. For example, if the set of preferred options includes three individual options, a first individual option having a highest probability of being selected may be displayed first. A second individual option having a second highest probability of being selected may be displayed second. A third individual option having a third highest probability of being selected may be displayed third. In this way, the user may be more quickly directed to a desired option.

In other embodiments, the order may not be based on the probabilities of the individual options. For example, a first option displayed in the UI may be an option recommended by an administrator or an administrative body of an organization for which the user works. The first option may be followed by other options, which may be ordered based on probabilities, or the other options may be ordered based on a relative weighting of other context category/option matrices or other criteria. In some embodiments, the first option may be an option preferred by the user, or an option used most commonly by the user in the past.

Further, in some embodiments, options with probabilities above a threshold probability (e.g., 80%) may be displayed, and options with probabilities below the threshold probability may not be displayed. The probabilities may also be indicated. For example, the probabilities may be displayed textually next to the option, and/or the options may be color coded based on a probability range of each option. Additionally or alternatively, icons may be displayed indicating the probabilities, or indicating a relevance of each option from different perspectives. For example a first icon may symbolize a preference of an institution, a second icon may symbolize a peer preference, a third option may symbolize a user preference, and so on.

At 324, method 300 includes receiving a selection of an option of the set of preferred options by the user. As described above, the user may select the option in the UI on the display of the computing device. At 326, the selected option may be applied in the automated workflow assistance service. For example, applying the selected option may include loading a selected application, file, model, tool, layout, and/or configuration. Alternatively, applying the selected option may include selecting a next stage of the workflow, or fulfilling a request for information used to navigate the decision point of the workflow. Method 300 may end.

Figure 4:
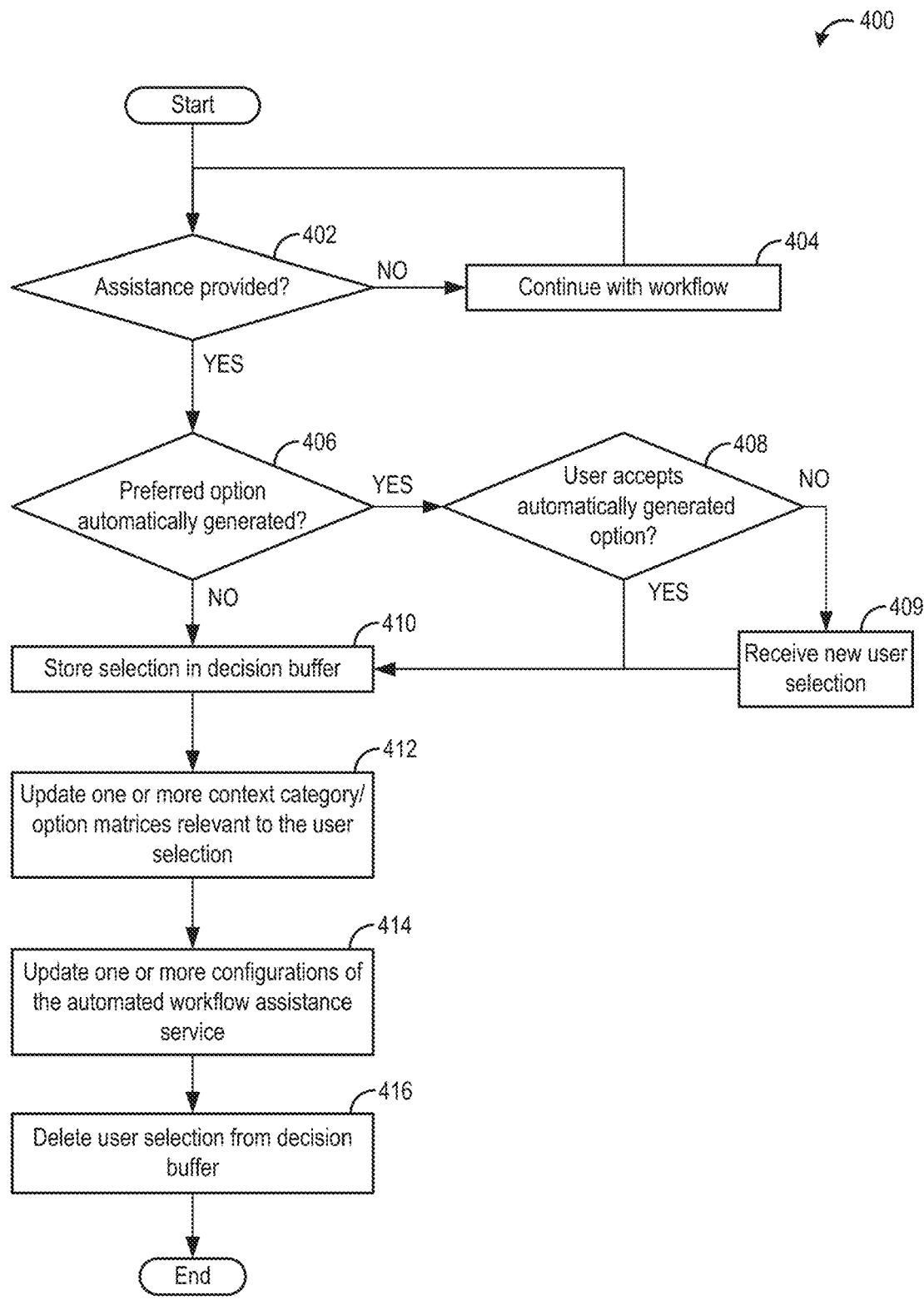
FIG. 4 is a flowchart illustrating an exemplary method for updating a context category/option matrix used to predict a workflow option, in accordance with one or more embodiments of the present disclosure.

Referring now to FIG. 4, an exemplary method 400 is shown for updating one or more context category/option matrices (e.g., context category/option matrix 200 of FIG. 2A) and/or one or more configurations (e.g., configurations 122 of memory 120 of FIGS. 1A-1D) of an automated workflow assistance service installed on a computing device. The one or more context category/option matrices and/or the one or more configurations may be used by an assistive AI algorithm (e.g., assistive AI algorithm 132) to predict an option to be selected by a user during a workflow, when the user is reviewing one or more medical exams using the automated workflow assistance. The one or more context category/option matrices may include information used by the assistive AI algorithm to predict the option. Updating the one or more configurations may include updating one or more rules of the assistive AI algorithm and/or one or more other rule-based algorithms used to predict preferred options and/or probabilities of one or more preferred options of being selected by the user.

In various embodiments, the context category/option matrices and the configurations may be updated on a semi-continuous basis, where information generated as a result of selections made by the user is used to update the context category/option matrices and the configurations. For example, each time the user makes a selection of an option at a decision point, the selection may be used to update either or both of the one or more context category/option matrices and/or the one or more configurations.

In one embodiment, the matrices, or a portion of the matrices may be managed and updated via a remote service. For example, matrices capturing peer usage may benefit from being updated using a centralized service that may be shared across systems, sites of a given institution, or across institutions. The information may be anonymized and minimized for regulatory compliance.

Method 400 begins at 402, where method 400 includes determining whether assistance was provided by the automated workflow assistance service at a decision point in the workflow. In other words, the updating of the prediction framework may occur after the user makes a selection of an option, where the selection provides feedback to the automated workflow assistance service. The feedback may be used to increase an accuracy of the automated workflow assistance service.

If it is determined at 402 that no assistance has been provided by the automated workflow assistance service, method 400 proceeds to 404. At 404, method 400 includes continuing with the workflow, and updating of the prediction framework may not occur. If it is determined at 402 that assistance has been provided by the automated workflow assistance service, method 400 proceeds to 406.

At 406, method 400 includes determining whether a preferred option was automatically generated. As described above in reference to FIG. 3, if an option of a set of preferred options has a probability of being selected that exceeds a threshold probability, the option may be automatically selected for the user by the assistive AI algorithm.

If at 406 it is determined that a preferred option was not automatically generated, it may be inferred the set of preferred options was displayed in the UI of the user, and that a selection of a preferred option was made manually by the user via the UI. Method 400 proceeds to 410, where method 400 includes storing the selection made by the user via the UI in a decision buffer of the automated workflow assistance service. The decision buffer may be a non-limiting example of decision buffer 134 of FIGS. 1A-1D, and may correspond to a temporary location in random access memory (RAM) of the computing device.

If at 406 it is determined that a preferred option was automatically generated, method 400 proceeds to 408. At 408, method includes determining whether the automatically generated option was modified by the user. For example, the user may decide that a different option would be more suitable than the automatically generated option, whereby the automatically generated option may not be accepted by the user. If the automatically generated option is not accepted by the user, the user may manually select a different option. For example, in some embodiments, when an option is automatically generated, a control element (e.g., a button) for rejecting the automatically generated option may be displayed on a display of the computing device. For example, the control element may be displayed in a dialog box generated by the automated workflow assistance service, or the control element may be displayed at a location within a UI of the automated workflow assistance service. If the user selects the control element, a menu may be displayed on the display (e.g., within a pop-up window) allowing the user to select a different option than the automatically generated option. For example, the menu may include a set of preferred options generated by the assistive AI algorithm, as described above in reference to method 300 of FIG. 3. In yet other embodiments, the assistive AI algorithm may infer from the user's decisions that an option was not relevant.

If at 408 the user does not select the control element (e.g., within a threshold time), it may be inferred that the user accepts the automatically generated option, whereby method 400 proceeds to 410 to store the automatically generated option in the decision buffer. If at 408 the user selects the control element, indicating that the user does not accept the automatically generated option, method 400 proceeds to 409. At 409, method 400 includes receiving a new selection from the user (e.g., via the menu). After receiving the new selection from the user, method 400 proceeds to 410 to store the new user selection in the decision buffer.

At 412, method 400 includes updating one or more context category/option matrices relevant to the user selection. The one or more context category/option matrices relevant to the user selection may include one or more context category/option matrices used to generate the set of preferred options displayed in the UI. For example, for a user selection of an application to review a loaded exam, as described above in reference to method 300 of FIG. 3, a local usage exam type/application matrix (e.g., the local usage exam type/application matrix 260 of FIG. 2D) may be consulted during generation of a set of preferred applications. After the user makes a selection of an application of the set of preferred options, the local usage exam type/application matrix may be updated. During updating of the local usage exam type/application matrix, a value of the local usage exam type/application matrix corresponding to the selected application may be replaced with a different value. For example, if the value represents a percentage of times that the selected application is selected by local users, the value may be increased to reflect that the application has been selected an additional time. Similarly, a peer usage exam type/application matrix may be consulted during generation of a set of preferred applications. After the user makes the selection of the application, the peer usage exam type/application matrix may be similarly updated. In various embodiments, the peer usage exam type/application matrix may be updated in a continuous or semi-continuous manner from log data aggregated across an institution or across various institutions.

Additionally or alternatively, a user preference exam type/application matrix may be consulted, where the user preference exam type/application matrix may include values that reflect a preference of the user with regard to various available applications. After the user selects a desired application, the user preference exam type/application matrix may be updated to reflect a stronger preference of the user for the selected application. By updating the user preference exam type/application matrix, the assistive AI algorithm may "learn" an evolving set of preferences of the user, resulting in a higher accuracy of the prediction framework.

In some embodiments, a performance of each option offered to the user may be compared, and a highest performing option may be recommended to the user. As an alternative, a performance of an option selected by the user may be compared with a last option selected by the user.

At 414, method 400 includes updating one or more configurations of the automated workflow assistance service. For example, similar to the user preference exam type/application matrix, a user preference configuration may indicate a preference of the user regarding how information (e.g., values) of various context category/option matrices are consulted and/or combined. The user preference configuration may indicate that for a given decision point (e.g., like selecting an application), the user prefers that certain context category/option matrices be consulted, and/or that other context category/option matrices not be consulted. For example, a user may find a local recommendation for an application for reviewing a certain type of exam to be a poor recommendation, whereby the user may choose to specify in the user preference configuration not to consult a local configuration exam type/application matrix when generating the set of preferred options. The user may also choose to specify in the user preference configuration a preference for how probabilities of one or more preferred options are calculated, or what rules should be applied or not applied in calculating the probabilities.

Other configurations may also be updated based on the selection of the user. For example, a user may adjust a configuration for a certain type of exam to reflect an evolution of opinion or consensus of a user or research community regarding how an exam might be performed, or what types of information might be considered when performing tasks during a review process. For example, rules for calculating probabilities of an option being selected by the user may be edited to adjust a weighting of certain factors over other factors. Additionally, as new applications, tools, layouts, and other elements considered at various decision points of a workflow become available, one or more configurations and/or context category/option matrices may be updated to include the new applications, tools, layouts, and other elements. An updating of the configurations may be performed at an institution level, or across institutions.

In various embodiments, the user may update one or more configurations manually. For example, the user may select a configuration from a plurality of stored configurations via a menu of the UI. A textual and/or graphical representation of the configuration may be displayed in the UI, and the user may edit the textual and/or graphical representation of the configuration using one or more input devices of the computing device (e.g., a mouse, a keyboard, a touchpad, etc.).

One advantage of updating the context category/option matrices and configurations based on user selections is that important feedback may be provided to research, development, marketing, and sales teams of a manufacturer of the automated workflow assistance service. The feedback may be collected across institutions and centralized. For example, over time, updated values of a context category/option matrix may provide feedback regarding adoption of features or elements of automated workflow assistance service, or exam review applications used within it, to a product manager of the manufacturer. Based on the adoption feedback, the product manager may adjust a product roadmap or development strategy of one or more associated products, or to determine user needs. Marketing and sales teams may also use the adoption feedback to determine whether products are being used in an intended manner or for an intended use, and to determine how well products are targeting potential customers.

Once the configurations of the automated workflow assistance service have been updated, at 416, method 400 includes deleting the user selection from the decision buffer, and method 400 may end.

Thus, a novel framework is proposed herein for providing automated assistance to a user of a computing device, such as a radiologist, when the user is performing a review of a medical exam. The automated assistance may be provided via an automated workflow assistance service running on the computing device. The automated workflow assistance service may intervene in a workflow of the user at various decision points of the workflow, to assist the user in selecting an appropriate option for a subsequent task of the workflow from a plurality of available options. To assist the user in selecting the appropriate option, an assistive AI algorithm of the automated workflow assistance service may consult one or more context category/option matrices stored in a memory of the computing device, where the one or more context category/option matrices may include information about a relative suitability of different options available to the user at the decision point. Consultation of the one or more context category/option matrices may be performed in accordance with one or more configurations stored in the memory, where the configurations may be selected by the user or preselected based on the medical exam and/or the workflow.

One advantage of the systems and methods disclosed herein is that an explainability of how a recommendation was generated may be high. For example, it may be clear to a user that a given option was rated highly even when the user has never used it, because the option is intended for a relevant context and is pervasively used across a community of local users or peers. As a result of this explainability, it may be possible to integrate user configurations that guide a user to select a relevant option for a given input category. Additionally, as a result of combining multiple perspectives, a "cold start" may be supported, where little data is used to generate initial recommendations, and recommendations can become more and more relevant over time. For example, an initial recommendation may be based on an intended use matrix that indicates one or more options intended for a given input context. After some usage, a local usage and/or peer usage matrix may provide additional data to improve the initial recommendation. Thus, a simple way is provided to mix domain expertise input (e.g., intended use) with data-based input (e.g., peer use), which may be more challenging with alternative systems.

Because a number of available options at a decision point may be large, the assistive AI algorithm may reduce a time spent by the user selecting a suitable option by generating a set of preferred options, where a number of preferred options is smaller than the number of available options. If a probability of a first preferred option is higher than probabilities of other options of the set of preferred options, the first preferred option may be automatically selected for the user and applied. Alternatively, if a most probable option is not identified, the set of preferred options may be displayed on a screen of the computing device, where the user may select a desired option of the preferred options.

By automatically selecting the most probable option, or by presenting the user with a shorter list of proposed options rather than a full list of available options, a frustration of the user due to navigating a plurality of menus during a workflow of the application may be reduced. Additionally, the one or more context category/option matrices may be consulted in a sequential and/or iterative manner to reduce an amount of time, memory, and processing used to generate the set of preferred options. As a result, the set of preferred options may be generated and displayed in real time. In contrast, other AI-based decision models or recommendation models may entail collecting and processing large amounts of data to generate a set of preferred options, whereby the other AI-based decision models or recommendation models may not generate a set of preferred options in real time. Further, the reduction in memory usage and processing due to the sequential and/or iterative manner of consulting the one or more context category/option matrices may reduce a demand for resources of the computing device, thereby freeing up the resources to be used in other applications that the user relies on.

An additional advantage of the systems and methods disclosed herein is that because assistance is provided at individual decision points rather than an end-to-end process, it may be applied in a variety of contexts and domains. As one example, a user may use proposal management software to generate an offer for a client, where decision points may relate to deciding which options to include in the offer. One or more options may be automatically selected or recommended to a salesperson based on successful sales generated by peers of the salesman, or based on sales guidelines issued by a company of the salesman. If a sale is not made, one or more recommendations and/or selections may be adjusted, such that as successful sales increase over time, better recommendations and/or selections may be made.

The proposed approach may be especially valuable in domains where decision making is expected to transition over a plurality of releases from user-driven decisions to automated decisions, with a final goal of full automation. In that sense, it provides a robust and practical methodology to ensure that the right ground truths are captured over time to support this transition.

The technical effect of providing automated workflow assistance to a user of a computing device via an assistive AI algorithm that consults one or more context category/option matrices stored in a memory of the computing device, is that an amount of time, memory, and processing used to generate one or more preferred workflow options for the user may be reduced with respect to other AI-based approaches.

The disclosure also provides support for a system, comprising: a computing device including one or more processors having executable instructions stored in a non-transitory memory that, when executed, cause the one or more processors to: during operation of an automated assistance service running on the computing device, the automated assistance service configured to provide automated assistance to a user when using one or more software applications running on the computing device: when the user is prompted to select an option of a plurality of options of the automated assistance service at a step of the operation, provide automated assistance to the user in selecting the option, by predicting one or more preferred options based on administrative guidelines, best practices, and previous selections made at the step by the user, peers of the user, and other local users, and execute the selected option of the automated assistance service based on the prediction. In a first example of the system, predicting one or more preferred options based on administrative guidelines, best practices, and previous selections made at the step by the user, peers of the user, and other local users further comprises consulting information included in one or more context category/options matrices stored in the non-transitory memory, and predicting the one or more preferred options based on the consulted information. In a second example of the system, optionally including the first example, providing automated assistance to the user in selecting the option further comprises automatically selecting one option of the one or more preferred options, and executing the automatically selected option. In a third example of the system, optionally including one or both of the first and second examples, the one option has a probability of being selected that exceeds, by a threshold difference, a probability of each other option of the one or more preferred options being selected. In a fourth example of the system, optionally including one or more or each of the first through third examples, providing automated assistance to the user in selecting the option further comprises displaying the predicted one or more preferred options in a user interface (UI) of the computing device, and applying an option selected by the user via the UI. In a fifth example of the system, optionally including one or more or each of the first through fourth examples, a number of the predicted one or more preferred options is less than a number of the plurality of options, and displaying the predicted one or more preferred options in the UI further comprises displaying the predicted one or more preferred options in an order of preference, the order of preference based on the probability of each option of the one or more preferred options being selected. In a sixth example of the system, optionally including one or more or each of the first through fifth examples, predicting the one or more preferred options based on information included in one or more context category/options matrices further comprises updating the one or more context category/options matrices based on one of: a selection of an option displayed in the UI by the user, and an acceptance of an automatically selected option by the user. In a seventh example of the system, optionally including one or more or each of the first through sixth examples, consulting information included in the one or more context category/options matrices further comprises: selecting a configuration of the automated assistance service from a plurality of configurations stored in the non-transitory memory, the configuration based on the step of the operation, selecting the one or more context category/options matrices from a set of available context category/options matrices based on the selected configuration, consulting information included in the selected one or more context category/options matrices. In a eighth example of the system, optionally including one or more or each of the first through seventh examples, consulting the information included in the selected one or more context category/ options matrices further comprises consulting the information in accordance with a prediction mode defined in the selected configuration, the prediction mode establishing a range of options to include in the set of preferred options. In a ninth example of the system, optionally including one or more or each of the first through eighth examples, the step of the operation includes prompting the user to select an option for an application to review a selected medical exam on the computing device, and selecting the configuration of the automated assistance service based on the step of the operation further comprises selecting a configuration associated with a type of the selected medical exam. In a tenth example of the system, optionally including one or more or each of the first through ninth examples, the selected one or more context category/options matrices include: a first exam type/application matrix, indicating a suitability of each application of a list of available applications, for each exam type of a list of exam types, a second exam type/application matrix, indicating a frequency with which each application of the list of available applications was previously selected by peers of the user, for each exam type of the list of exam types, a third exam type/application matrix, indicating a frequency with which each application of the list of available applications was previously selected by other users at a location of the user, for each exam type of the list of exam types, and a fourth exam type/application matrix, indicating whether each application of the list of available applications is recommended at a location of the user based on local guidelines, for each exam type of the list of exam types. In a eleventh example of the system, optionally including one or more or each of the first through tenth examples, consulting the information included in the selected one or more context category/options matrices further comprises: consulting the first exam type/application matrix to determine a first set of suitable applications from the list of available applications, the first set of suitable applications excluding unsuitable applications of the list of available applications, consulting the second exam type/application matrix to determine a second set of peer recommended applications from the first set of suitable applications, the second set of peer recommended applications excluding applications of the first set of suitable applications that are not used by the peers, consulting the third exam type/application matrix to determine a third set of locally preferred applications from the second set of peer recommended applications, the third set of locally preferred applications excluding applications of the second set of peer recommended applications that are not used locally, consulting the fourth exam type/application matrix to determine a fourth set of locally recommended applications from the third set of locally preferred applications, the fourth set of locally preferred applications excluding applications of the third set of locally preferred applications that are not locally recommended, predicting a probability of each option of the fourth set of locally preferred applications based on the information of the first set of suitable applications, the second set of peer recommended applications, the third set of locally preferred applications, and the fourth set of locally preferred applications, and generating the set of one or more preferred options based on the predicted probabilities. In a twelfth example of the system, optionally including one or more or each of the first through eleventh examples, an algorithm for predicting the probability of each option of the fourth set of locally preferred applications is included in the selected configuration.

The disclosure also provides support for a method, comprising: during operation of a software application running on a computing device by a user, the user prompted to select an option of a plurality of options of the software application at a step of the operation: predicting, via an automated assistance service running on the computing device, one or more preferred options of a plurality of options of the software application based on administrative guidelines, best practices, and previous selections made by the user, peers of the user, and other local users, displaying the one or more preferred options on a display device of the software application, receiving a selection of a most suitable option of the one or more preferred options from the user, applying the selected option in the software application. In a first example of the method, predicting the one or more preferred options based on the administrative guidelines, the best practices, and the previous selections made by the user, the peers of the user, and the other local users further comprises: consulting information included in one or more context category/options matrices stored in a memory of the computing device, the one or more context category/options matrices selected based on a prediction mode defined in a configuration of the automated assistance service, the configuration selected based on the step of the operation, and predicting the one or more preferred options based on the consulted information. In a second example of the method, optionally including the first example, the selected one or more context category/options matrices include at least one of: an intended use matrix, indicating one or more options intended to be selected at the step of the operation by a designer of the one or more options, a peer usage matrix, indicating one or more options used by peers of the user at the step of the operation, a local usage matrix, indicating one or more options used by other users on a network of the user at the step of the operation, and a local configuration matrix, indicating one or more options recommended at the step of the operation by an administrator of the user. In a third example of the method, optionally including one or both of the first and second examples, consulting the information included in the selected one or more context category/options matrices further comprises: selecting a first set of preferred options by consulting information included in a first matrix, the first matrix one of the intended use matrix, the peer usage matrix, the local usage matrix, and the local configuration matrix, and selecting the one or more preferred options from the first set of preferred options by consulting information included in a second matrix, the second matrix one of the intended use matrix, the peer usage matrix, the local usage matrix, and the local configuration matrix.

The disclosure also provides support for a method, comprising: during operation of a software application running on a computing device by a user, the user prompted to select an option of a plurality of options of the software application at a step of the operation: automatically selecting, via an automated assistance service running on the computing device, a preferred option of a plurality of options of the software application based on administrative guidelines, best practices, and previous selections made by the user, peers of the user, and other local users, and applying the selected option in the software application. In a first example of the method, automatically selecting the preferred option based on the administrative guidelines, the best practices, and the previous selections made by the user, the peers of the user, and the other local users further comprises automatically selecting the preferred option based on information included in one or more context category/options matrices stored in a memory of the computing device, the one or more context category/options matrices including at least one of: an intended use matrix, indicating one or more options intended to be selected at the step of the operation by a designer of the one or more options, a peer usage matrix, indicating one or more options used by peers of the user at the step of the operation, a local usage matrix, indicating one or more options used by other users on a network of the user at the step of the operation, and a local configuration matrix, indicating one or more options recommended at the step of the operation by an administrator of the user. In a second example of the method, optionally including the first example, the preferred option is selected after sequentially eliminating options of the plurality of options based on information included in the one or more context category/options matrices.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A method, comprising:
   during operation of a software application running on a computing device by a user, the user prompted to select an option of a plurality of options of the software application at a step of the operation, wherein the step of the operation includes prompting the user to select an option for an application to review a selected medical exam on the computing device:
      predicting, via an automated assistance service running on the computing device, one or more preferred options of a plurality of options of the software application based on administrative guidelines, best practices, and previous selections made by the user, peers of the user, and other local users by:
         consulting information included in one or more context category/options matrices stored in a memory of the computing device, the one or more context category/options matrices selected based on a prediction mode defined in a configuration of the automated assistance service, the configuration selected based on the selected medical exam; and
         predicting the one or more preferred options based on the consulted information;
      displaying the one or more preferred options on a display device of the software application;
      receiving a selection of a most suitable option of the one or more preferred options from the user; and
      applying the selected option in the software application,
   wherein the selected one or more context category/options matrices include at least one of:
      an intended use matrix, indicating one or more options intended to be selected at the step of the operation by a designer of the one or more options;
      a peer usage matrix, indicating one or more options used by peers of the user at the step of the operation;
      a local usage matrix, indicating one or more options used by other users on a network of the user at the step of the operation; and
      a local configuration matrix, indicating one or more options recommended at the step of the operation by an administrator of the user, and
   wherein consulting the information included in the selected one or more context category/options matrices further comprises:
      selecting a first set of preferred options by consulting information included in a first matrix, the first matrix one of the intended use matrix, the peer usage matrix, the local usage matrix, and the local configuration matrix; and
      selecting the one or more preferred options from the first set of preferred options by consulting information included in a second matrix, the second matrix one of the intended use matrix, the peer usage matrix, the local usage matrix, and the local configuration matrix.

2. A system, comprising:
   a computing device including one or more processors having executable instructions stored in a non-transitory memory that, when executed, cause the one or more processors to:
      during operation of an automated assistance service running on the computing device, the automated assistance service configured to provide automated assistance to a user when using one or more software applications running on the computing device:
         when the user is prompted to select an option of a plurality of options of the automated assistance service at a step of the operation, provide automated assistance to the user in selecting the option, by predicting one or more preferred options based on administrative guidelines, best practices, and previous selections made at the step by the user, peers of the user, and other local users, wherein the step of the operation includes prompting the user to select an option for an application to review a selected medical exam on the computing device; and
         execute the selected option of the automated assistance service based on the prediction,
   wherein predicting one or more preferred options based on administrative guidelines, best practices, and previous selections made at the step by the user, peers of the user, and other local users further comprises consulting information included in one or more context category/ options matrices stored in the non-transitory memory, and predicting the one or more preferred options based on the consulted information, wherein providing automated assistance to the user in selecting the option further comprises automatically selecting one option of the one or more preferred options, and executing the automatically selected option, wherein the one option has a probability of being selected that exceeds, by a threshold difference, a probability of each other option of the one or more preferred options being selected, wherein providing automated assistance to the user in selecting the option further comprises displaying the predicted one or more preferred options in a user interface (UI) of the computing device, and applying an option selected by the user via the UI, wherein a number of the predicted one or more preferred options is less than a number of the plurality of options, and displaying the predicted one or more preferred options in the UI further comprises displaying the predicted one or more preferred options in an order of preference, the order of preference based on the probability of each option of the one or more preferred options being selected, wherein consulting information included in the one or more context category/options matrices further comprises:
selecting a configuration of the automated assistance service from a plurality of configurations stored in the non-transitory memory, the configuration based on the selected medical exam;
selecting the one or more context category/options matrices from a set of available context category/options matrices based on the selected configuration; and
consulting information included in the selected one or more context category/options matrices, and
wherein selecting the configuration of the automated assistance service based on the step of the operation further comprises selecting a configuration associated with a type of the selected medical exam.

3. The system of claim 2, wherein the selected one or more context category/options matrices include:
a first exam type/application matrix, indicating a suitability of each application of a list of available applications, for each exam type of a list of exam types;
a second exam type/application matrix, indicating a frequency with which each application of the list of available applications was previously selected by peers of the user, for each exam type of the list of exam types;
a third exam type/application matrix, indicating a frequency with which each application of the list of available applications was previously selected by other users at a location of the user, for each exam type of the list of exam types; and
a fourth exam type/application matrix, indicating whether each application of the list of available applications is recommended at a location of the user based on local guidelines, for each exam type of the list of exam types.

4. The system of claim 3, wherein consulting the information included in the selected one or more context category/options matrices further comprises:
consulting the first exam type/application matrix to determine a first set of suitable applications from the list of available applications, the first set of suitable applications excluding unsuitable applications of the list of available applications;
consulting the second exam type/application matrix to determine a second set of peer recommended applications from the first set of suitable applications, the second set of peer recommended applications excluding applications of the first set of suitable applications that are not used by the peers;
consulting the third exam type/application matrix to determine a third set of locally preferred applications from the second set of peer recommended applications, the third set of locally preferred applications excluding applications of the second set of peer recommended applications that are not used locally;
consulting the fourth exam type/application matrix to determine a fourth set of locally recommended applications from the third set of locally preferred applications, the fourth set of locally preferred applications excluding applications of the third set of locally preferred applications that are not locally recommended;
predicting a probability of each option of the fourth set of locally preferred applications based on the information of the first set of suitable applications, the second set of peer recommended applications, the third set of locally preferred applications; and the fourth set of locally preferred applications; and
generating the set of one or more preferred options based on the predicted probabilities.

5. The system of claim 4, wherein an algorithm for predicting the probability of each option of the fourth set of locally preferred applications is included in the selected configuration.

6. The system of claim 2, wherein predicting the one or more preferred options based on information included in one or more context category/options matrices further comprises updating the one or more context category/options matrices based on one of:
a selection of an option displayed in the UI by the user; and
an acceptance of an automatically selected option by the user.

7. The system of claim 2, wherein consulting the information included in the selected one or more context category/options matrices further comprises consulting the information in accordance with a prediction mode defined in the selected configuration, the prediction mode establishing a range of options to include in the set of preferred options.

8. A method, comprising:
during operation of a software application running on a computing device by a user, the user prompted to select an option of a plurality of options of the software application at a step of the operation, wherein the step of the operation includes prompting the user to select an option for an application to review a selected medical exam on the computing device:
automatically selecting, via an automated assistance service running on the computing device, a preferred option of a plurality of options of the software application based on administrative guidelines, best practices, and previous selections made by the user, peers of the user, and other local users by:
consulting information included in one or more context category/options matrices stored in a memory of the computing device, the one or more context category/options matrices selected based on a prediction mode defined in a configuration of the automated assistance service, the configuration selected based on the selected medical exam; and
predicting the one or more preferred options based on the consulted information; and
applying the selected option in the software application,
wherein consulting the information included in the selected one or more context category/options matrices further comprises:
selecting a first set of preferred options by consulting information included in a first matrix, the first matrix one of the intended use matrix, the peer usage matrix, the local usage matrix, and the local configuration matrix; and
selecting the one or more preferred options from the first set of preferred options by consulting information included in a second matrix, the second matrix one of the intended use matrix, the peer usage matrix, the local usage matrix, and the local configuration matrix.

9. The method of claim 8, wherein automatically selecting the preferred option based on the administrative guidelines, the best practices, and the previous selections made by the user, the peers of the user, and the other local users further comprises automatically selecting the preferred option based on information included in one or more context category/options matrices stored in a memory of the computing device, the one or more context category/options matrices including at least one of:
an intended use matrix, indicating one or more options intended to be selected at the step of the operation by a designer of the one or more options;
a peer usage matrix, indicating one or more options used by peers of the user at the step of the operation;
a local usage matrix, indicating one or more options used by other users on a network of the user at the step of the operation; and
a local configuration matrix, indicating one or more options recommended at the step of the operation by an administrator of the user.

10. The method of claim 9, wherein the preferred option is selected after sequentially eliminating options of the plurality of options based on information included in the one or more context category/options matrices.

11. A system, comprising:
a computing device including one or more processors having executable instructions stored in a non-transitory memory that, when executed, cause the one or more processors to:
during operation of an automated assistance service running on the computing device, the automated assistance service configured to provide automated assistance to a user when using one or more software applications running on the computing device:
when the user is prompted to select an option of a plurality of options of the automated assistance service at a step of the operation, provide automated assistance to the user in selecting the option, by predicting one or more preferred options based on administrative guidelines, best practices, and previous selections made at the step by the user, peers of the user, and other local users, wherein the step of the operation includes prompting the user to select an option for an application to review a selected medical exam on the computing device; and
execute the selected option of the automated assistance service based on the prediction,
wherein predicting one or more preferred options based on administrative guidelines, best practices, and previous selections made at the step by the user, peers of the user, and other local users further comprises consulting information included in one or more context category/options matrices stored in the non-transitory memory, and predicting the one or more preferred options based on the consulted information,
wherein providing automated assistance to the user in selecting the option further comprises automatically selecting one option of the one or more preferred options, and executing the automatically selected option,
wherein the one option has a probability of being selected that exceeds, by a threshold difference, a probability of each other option of the one or more preferred options being selected,
wherein providing automated assistance to the user in selecting the option further comprises displaying the predicted one or more preferred options in a user interface (UI) of the computing device, and applying an option selected by the user via the UI,
wherein a number of the predicted one or more preferred options is less than a number of the plurality of options, and displaying the predicted one or more preferred options in the UI further comprises displaying the predicted one or more preferred options in an order of preference, the order of preference based on the probability of each option of the one or more preferred options being selected,
wherein consulting information included in the one or more context category/options matrices further comprises:
selecting a configuration of the automated assistance service from a plurality of configurations stored in the non-transitory memory, the configuration based on the selected medical exam;
selecting the one or more context category/options matrices from a set of available context category/options matrices based on the selected configuration; and
consulting information included in the selected one or more context category/options matrices, and
wherein the plurality of configurations includes: a first configuration for a first exam on a first anatomical region of a patient, and a second configuration for a second exam on a second anatomical region of the patient.

* * * * *